United States Patent [19]

Mikoshiba et al.

[11] Patent Number: 5,391,720
[45] Date of Patent: Feb. 21, 1995

[54] IMIDAZOLE DYES FORMED BY REACTION OF IMIDAZOLES WITH DIAZONIUM SALTS

[75] Inventors: Hisashi Mikoshiba; Tomomi Tateishi, both of Kanagawa, Japan

[73] Assignee: Fuji Photo Film Co., Ltd., Kanagawa, Japan

[21] Appl. No.: 985,255

[22] Filed: Dec. 3, 1992

[30] Foreign Application Priority Data

Dec. 4, 1991 [JP] Japan ..................... 3-347705

[51] Int. Cl.$^6$ .............. C09B 29/36; C09B 23/00; C09B 23/10
[52] U.S. Cl. .................. 534/753; 534/765; 534/786; 534/759; 534/760; 534/761; 534/762; 534/763; 534/764; 534/768; 534/766; 534/793; 548/130; 548/135; 548/161; 548/184; 548/252; 548/312.7; 548/315.1; 548/325.5; 548/235; 544/333
[58] Field of Search .......... 534/753, 765, 786, 573 M, 534/759-766; 548/130, 135, 161, 184, 252, 312.7, 315.1, 325.5, 235; 546/281; 544/333

[56] References Cited

U.S. PATENT DOCUMENTS

| | | | |
|---|---|---|---|
| 3,102,879 | 9/1963 | Baumann et al. | 534/753 X |
| 3,173,907 | 3/1965 | Ulingsberg et al. | 534/753 X |
| 3,213,080 | 10/1965 | Bloom et al. | 534/753 |
| 3,409,606 | 11/1968 | Lutz et al. | 534/75 X |
| 3,480,630 | 11/1969 | Stahle et al. | 534/753 X |
| 3,910,794 | 10/1975 | Buisine et al. | 96/91 R |
| 3,981,885 | 9/1976 | Buchel et al. | 534/753 X |
| 4,079,130 | 3/1978 | Abdallah et al. | 534/753 X |
| 4,743,683 | 5/1988 | Tschopp | 534/753 |

FOREIGN PATENT DOCUMENTS

| | | | |
|---|---|---|---|
| 0331170 | 9/1989 | European Pat. Off. | 534/753 |
| 0340723 | 11/1989 | European Pat. Off. | 534/753 |
| 0423796A1 | 4/1991 | European Pat. Off. | 534/776 |
| 2129524 | 1/1973 | Germany | 503/227 |
| 57-67662 | 4/1982 | Japan | 534/753 |
| 1339378 | 12/1973 | United Kingdom | 534/753 |
| 2060671 | 5/1981 | United Kingdom | 534/753 |
| 2083726A | 3/1982 | United Kingdom | 534/753 |

OTHER PUBLICATIONS

L. M. Anderson et al., "A Mechanistic Study of the Reaction Between Aryldiazonium Ions and Imidazoles", *J. Chem. Soc. Perkin Trans. II,* (12), (1989) pp. 2055–2058.

K. Hofmann, *The Chemistry of Heterocyclic Compounds,* Imidazole and Its Derivatives Part I, published by Interscience Publishers, Inc., New York, (1953) pp. 136–141.

Chemical Abstracts, vol. 90, No. 6, Feb. 5, 1979, Columbus, Ohio, Abstract No. 40182a B. K. Park et al., *MO Theoretical Interpretation for Lambda–max of Synthesized Benzeneazo Imidazole Dyes,* p. 66, column 1.

*Primary Examiner*—Floyd D. Higel
*Attorney, Agent, or Firm*—Sughrue, Mion, Zinn, Macpeak & Seas

[57] ABSTRACT

Disclosed is an imidazole azo dye of formula (I), which is useful for image formation and as a filter dye, which has a sharp absorption wave and which is fast to light, heat, air, moisture and chemicals. Also disclosed is a thermal transfer dye-donating material containing imidazole azo dye(s) of formula (I) preferably along with aminopyrazole azo dye(s) of formula (II). The material gives a high-density image with good color reproduction, and the image formed has improved storage stability.

(Abstract continued on next page.)

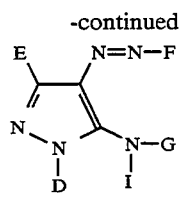

In (I), B and C independently represent a hydrogen atom or a substituent capable of being substituted in the imidazole ring; A represents an aryl or heterocyclic group; provided that when B is a hydrogen atom, C is not a hydrogen atom nor an alkyl group having from 1 to 3 carbon atoms; provided that when C is a hydrogen atom, B is not a substituted nor unsubstituted alkyl group; provided that C is not a mercapto group or an alkylthio group; and provided that B is not a carboxyl group.

In (II), D represents a hydrogen atom, or an alkyl, aryl, or heterocyclic group, E represents a substituent capable of being substituted in the pyrazole ring, F represents an aryl or heteroaromatic group, and G and I independently represent a hydrogen atom, or an alkyl, aryl, or heterocyclic group.

7 Claims, 5 Drawing Sheets

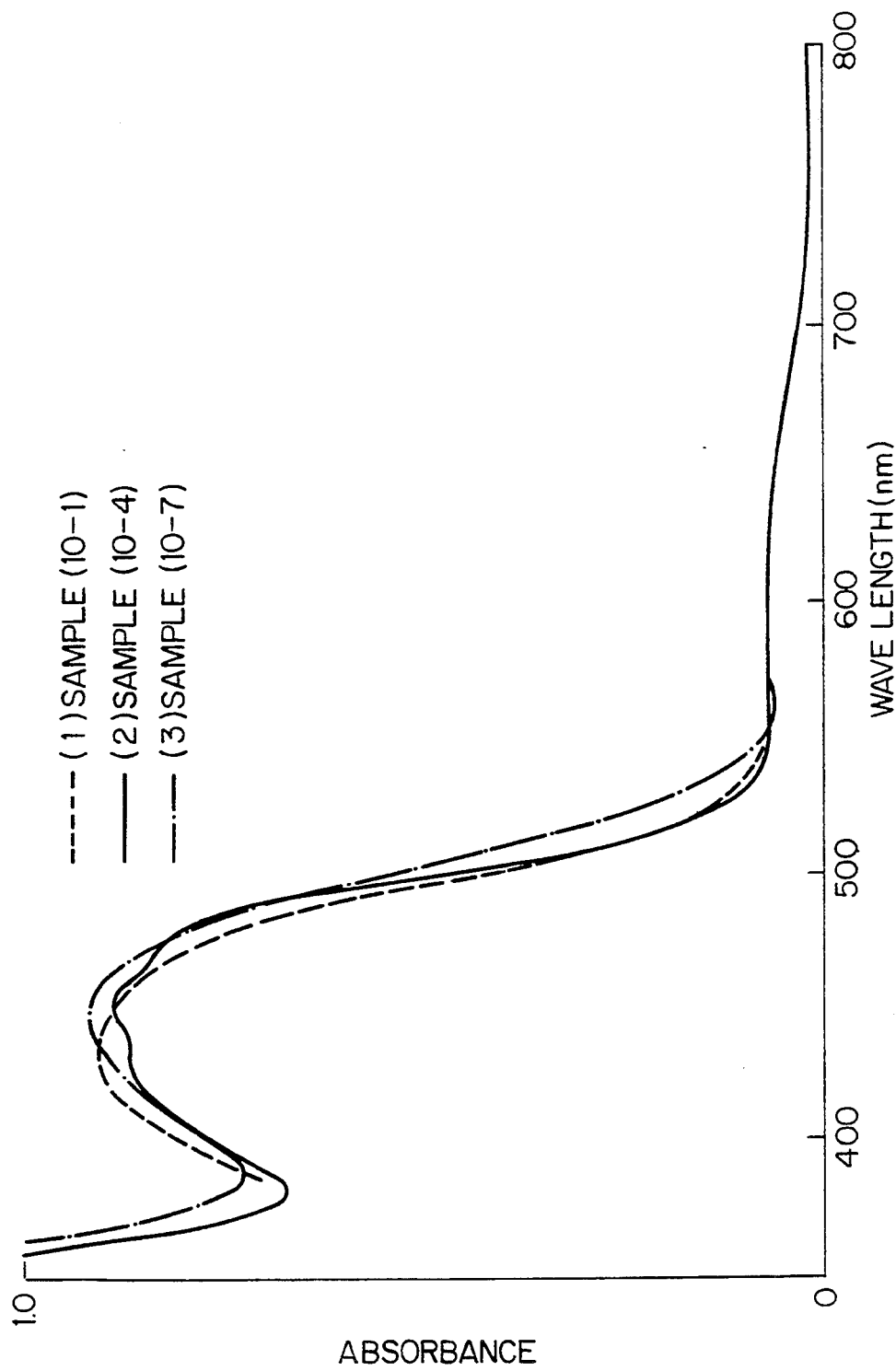

IMIDAZOLE DYES FORMED BY REACTION OF IMIDAZOLES WITH DIAZONIUM SALTS

FIELD OF THE INVENTION

The present invention relates to imidazole azo dyes having excellent absorption characteristics, having high fastness to light, heat, air, moisture and chemicals and having high thermal transferability, and to thermal transfer dye donating materials containing the dyes.

BACKGROUND OF THE INVENTION

Azo dyes are those to be formed by azo-coupling of so-called coupler components such as active hydrogen-containing compounds, phenols and p-dialkylaminobenzenes and a so-called diazo component of diazonium salts prepared from aminoaryl compounds or aminoheteroaromatic compounds. Since azo dyes are composed of selected coupler components and azo components of various structures, they have various tones and are typical components of dyes.

Of them, known are aminopyrazole azo dyes, pyridone azo dyes and diaminopyridine azo dyes as those having a heterocyclic coupler component.

Recently, color electronic photography, ink jet system color duplication, thermal transfer system color duplication, printing ink, and diffusion transfer system silver salt photography have become studied actively, and azo dyes are used as image forming dyes in them.

On the other hand, demand for filters for solid television camera tubes and color liquid crystal television is increasing with development of electroimaging, and azo dyes have become studied also as dyes for filters.

However, known azo dyes have various problems that need to be solved. For instance, the absorption of the dyes is not sufficiently sharp, thereby causing problems of the color reproducibility of the images from them and the capacity of filters containing them.

In addition, the dyes do not have sufficient fastness to light, heat, air, moisture and chemicals, which thereby causes problems of the storage stability of images from them and the durability of filters containing them.

Further, where the dyes are used for thermal transfer, the transferability of the dyes is not sufficient.

In addition, production of the dyes is difficult and the cost of the dyes is high.

In order to solve the above-mentioned problems, the present inventors earnestly studied azo dyes having a coupler component of imidazoles. As a result, they have found that imidazole azo dyes have sharp absorption, have high fastness to light, heat, air, moisture and chemicals and have high thermal transferability.

In addition, they have also found that when imidazole azo dyes are incorporated into thermal transfer dye-donating materials along with aminopyrazole azo dyes, the storage stability of the materials as well as the storage stability of images transferred on an image-receiving layer from them is extremely improved. On the basis of these findings, the present invention has been completed.

The related conventional knowledge is described below.

J. Chem. Soc., Perkin Trans. II (12), pages 2055-2058 has a description relating to the reactivity of imidazoles and diazonium salts. However, this bears no relation to the present invention. This has no description relating to dyes to be formed by reaction of imidazoles and diazonium salts.

DE-2129524 has a description referring to 2-alkyl-4-phenylazo-4H-imidazoles. However, this also bears no relation to the present invention. This merely mentions that imidazole azo compounds can be used as a microbicide and is silent on dyes.

SUMMARY OF THE INVENTION

One object of the present invention is to provide imidazole azo dyes having a sharp absorption wave.

Another object of the present invention is to provide imidazole azo dyes having high fastness to light, heat, air, moisture and chemicals.

Still another object of the present invention is to provide thermal transfer dye-donating materials capable of forming images having a high density, having good color reproducibility and having high fastness to heat, light, air, moisture and chemicals.

A further object of the present invention is to provide thermal transfer dye-donating materials which themselves have improved storage stability.

A still further object of the present invention is to provide thermal transfer dye-donating materials capable of transferring and forming dyes having improved storage stability on an image-receiving layer.

A still further object of the present invention is to provide dyes which may be produced with ease and are inexpensive.

A still further object of the present invention is to provide dyes capable of giving an excellent cyan color under a basic condition.

A still further object of the present invention is to provide dyes capable of being used for the image forming method which dyes are transferred on an image-receiving layer containing a mordant or a basic material.

The above-mentioned objects of the present invention have been attained by providing an imidazole azo dye of formula (I):

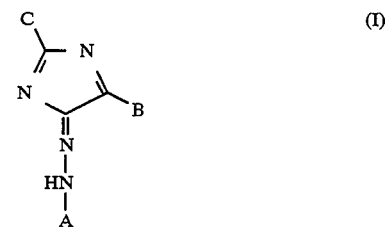

where B and C independently represent a hydrogen atom, or a non-metallic substituent capable of being substituted in the imidazole ring in the formula; and A represents an aryl group, or a heteroaromatic group; provided that when B is a hydrogen atom, C is not a hydrogen atom nor an alkyl group having from 1 to 3 carbon atoms; provided that when C is a hydrogen atom, B is not a substituted nor unsubstituted alkyl group; provided that C is not a mercapto group or an alkylthio group; and provided that B is not a carboxyl group.

Further, the above-mentioned objects have been attained by a thermal transfer dye-donating material having a dye-donating layer containing heat-mobile dye(s) on a support, in which the dye-donating layer contains at least one imidazole azo dye of formula (I):

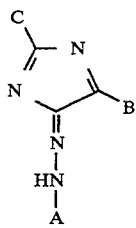

(I)

where B and C independently represent a hydrogen atom, or a non-metallic substituent capable of being substituted in the imidazole ring in the formula; and A represents an aryl group, or a heteroaromatic group.

Further, the above-mentioned objects also have been attained by providing a thermal transfer dye-donating material having a dye-donating layer containing heat-mobile dyes on a support, in which the dye-donating layer contains at least one imidazole azo dye of formula (I) and at least one aminopyrazole dye of formula (II):

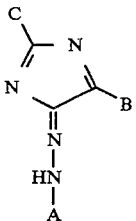

(I)

where B and C independently represent a hydrogen atom, or a non-metallic substituent capable of being substituted in the imidazole ring in the formula; and A represents an aryl group, or a heteroaromatic group:

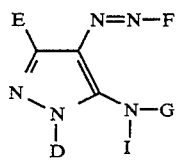

(II)

where D represents a hydrogen atom, an alkyl group, an aryl group, or a heterocyclic group;
- E represents a substituent capable of being substituted in the pyrazole ring in the formula;
- F represents an aryl group, or a heteroaromatic group; and
- G and I independently represent a hydrogen atom, an alkyl group, an aryl group, or a heterocyclic group.

BRIEF EXPLANATION OF THE DRAWINGS

FIG. 5 shows reflection spectra of color image-receiving material samples of Example 10, in which ① indicates sample (10-1) containing dye 3 of the present invention; ② indicates sample (10-4) containing dye 5 of the present invention; and ③ indicates sample (10-7) containing dye j.

DETAILED DESCRIPTION OF THE INVENTION

Figure 1:
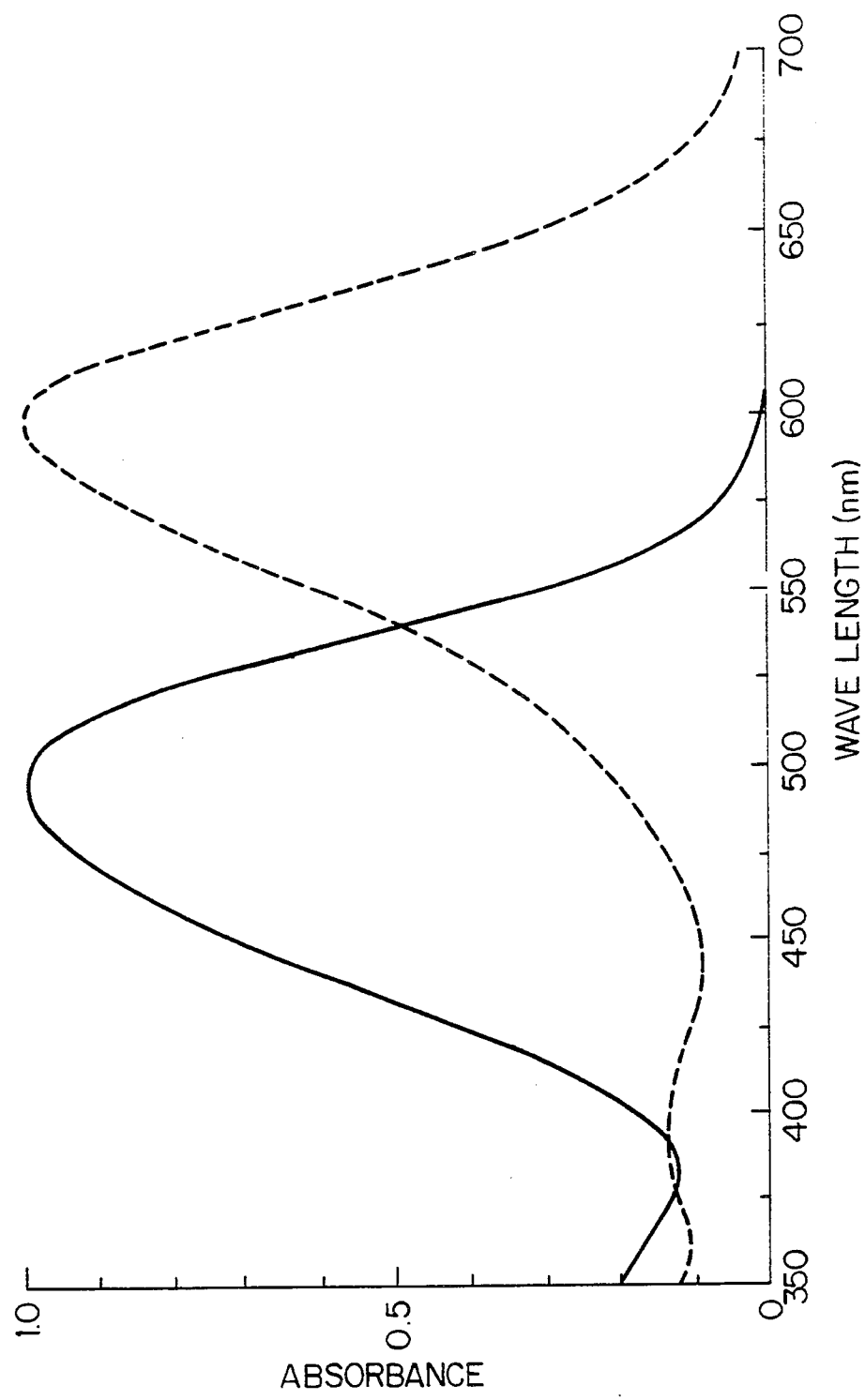
FIG. 1 shows absorption spectra of dye 79 of the present invention in ethyl acetate (solid line) and in dimethylformamide to which triethylamine is added (broken line).

Dyes of formula (I) are explained in detail hereunder.

A represents an aryl group or a heteroaromatic group, which will be explained in detail hereunder.

A is preferably an aryl group having from 6 to 30 carbon atoms, which may optionally be substituted. As substituents in A, mentioned are, for example, an alkyl group, an alkoxy group, an aryloxy group, an acyloxy group, an aryl group, a halogen atom, an aryloxycarbonyl group, an alkyloxycarbonyl group, a cyano group, a nitro group, a carbamoyl group, an acyl group, an acylamino group, an alkoxycarbonylamino group, an aryloxycarbonylamino group, an aminocarbonylamino group, a sulfonyl group, a sulfamoyl group, a sulfonylamino group, an amino group (including a substituted amino group), a hydroxyl group, and a heterocyclic group.

A is also preferably a heteroaromatic group having from 2 to 30 carbon atoms, which includes, for example, an imidazolyl group, a pyridyl group, a pyrazolyl group, a thiazolyl group, a benzimidazolyl group, a quinolyl group, a benzopyrazolyl group, a benzothiazolyl group, an isothiazolyl group, a benzisothiazolyl group, a pyridoisothiazolyl group, and a thiadiazolyl group.

Preferred examples of A are an aryl group having from 6 to 30 carbon atoms, such as a p-methoxyphenyl group, a m-methoxyphenyl group, an o-methoxyphenyl group, a p-chlorophenyl group, a m-chlorophenyl group, an o-chlorophenyl group, a p-nitrophenyl group, a p-cyanophenyl group, a p-(N,N-diethyl)phenyl group, a 2,4-dichlorophenyl group, a m-fluorophenyl group, a p-tolyl group, a p-mesylphenyl group, a 3,4-dicyanophenyl group, a 4-methoxycarbonylphenyl group and a 2,4,6-trichlorophenyl group; and a heterocyclic group having from 2 to 30 carbon atoms such as:

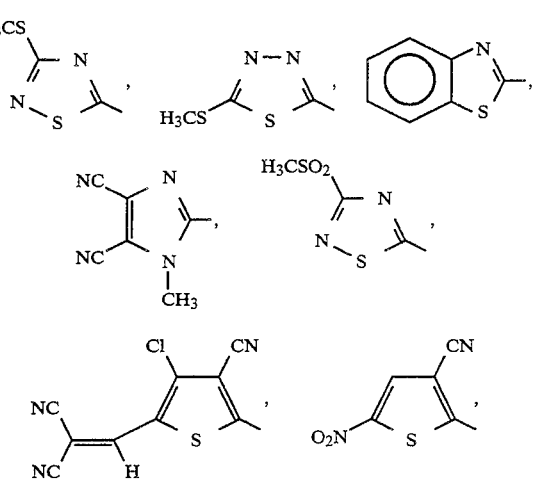

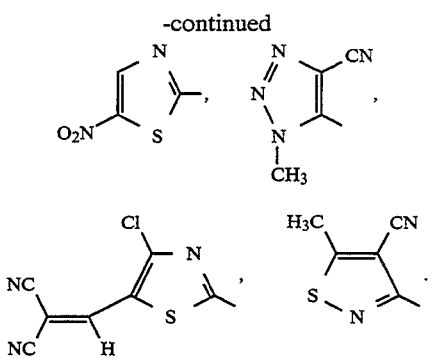

In formula (I), B and C independently represent a hydrogen atom, or a non-metallic substituent capable of being substituted in the imidazole ring in the formula.

Specific examples of B include those of C.

B is preferably an alkyl group (preferably having from 1 to 30 carbon atoms, such as methyl, ethyl, isopropyl, trifluoromethyl, t-butyl), an oxycarbonyl group (preferably having from 2 to 30 carbon atoms, such as methoxycarbonyl, ethoxycarbonyl, t-butoxycarbonyl, phenoxycarbonyl), an aminocarbonyl group (preferably having from 1 to 30 carbon atoms, such as methylaminocarbonyl, ethylaminocarbonyl, anilinocarbonyl), an acylamino group (preferably having from 1 to 30 carbon atoms, such as acetylamino, pivaloylamino, benzoylamino), an oxycarbonylamino group (preferably having from 2 to 30 carbon atoms, such as methoxycarbonylamino, ethoxycarbonylamino, t-butoxycarbonylamino, phenoxycarbonylamino), an aminocarbonylamino group (preferably having from 1 to 30 carbon atoms, such as aminocarbonylamino, methylaminocarbonylamino, ethylaminocarbonylamino, dimethylaminocarbonylamino, anilinocarbonylamino), a sulfonyl group (preferably having from 1 to 30 carbon atoms, such as methanesulfonyl, benzenesulfonyl), an acyl group (preferably having from 1 to 30 carbon atoms, such as acetyl, pivaloyl, benzoyl), a heterocyclic group (preferably having from 3 to 30 carbon atoms, such as those previously mentioned for A), an aryl group (preferably having from 6 to 30 carbon atoms, such as phenyl, m-acetylaminophenyl, p-methoxyphenyl), a carbamoyl group (preferably having from 1 to 30 carbon atoms, such as methylcarbamoyl, ethylcarbamoyl, dimethylcarbamoyl, n-octylcarbamoyl), an alkoxycarbonylamino group (preferably having from 2 to 30 carbon atoms, such as methoxycarbonylamino, ethoxycarbonylamino, methoxyethoxycarbonylamino), an aryloxycarbonylamino group (preferably having from 7 to 30 carbon atoms, such as phenoxycarbonylamino, p-methoxyphenoxycarbonylamino, p-methylphenoxycarbonylamino, m-chlorophenoxycarbonylamino, o-chlorophenoxycarbonylamino), a sulfonylamino group (preferably having from 1 to 30 carbon atoms, such as methanesulfonylamino, benzenesulfonylamino, toluenesulfonylamino), or a cyano group.

C includes, for example, a hydrogen atom, an aryl group, a heterocyclic group, an alkyl group, a cyano group, a carboxyl group, an acyl group, a carbamoyl group, an alkoxycarbonyl group, an aryloxycarbonyl group, an acylamino group, an alkoxycarbonylamino group, an aryloxycarbonylamino group, a sulfonylamino group, an aminocarbonylamino group, a sulfamoylamino group, an amino group (including an anilino group), an alkoxy group, an aryloxy group, a silyloxy group, a heteryloxy group, an arylthio group, and a heterylthio group.

As specific examples of C, mentioned are a hydrogen atom, an aryl group (preferably having from 6 to 30 carbon atoms, such as phenyl, m-acetylaminophenyl, p-methoxyphenyl), an alkyl group (preferably having from 1 to 30 carbon atoms, such as methyl, ethyl, isopropyl, t-butyl, n-octyl, n-dodecyl), a cyano group, an acyl group (preferably having from 1 to 30 carbon atoms, such as acetyl, pivaloyl, benzoyl, furoyl, 2-pyridyl), a carbamoyl group (preferably having from 1 to 30 carbon atoms, such as methylcarbamoyl, ethylcarbamoyl, dimethylcarbamoyl, n-octylcarbamoyl), an alkoxycarbonyl group (preferably having from 1 to 30 carbon atoms, such as methoxycarbonyl, ethoxycarbonyl, isopropoxycarbonyl), an aryloxycarbonyl group (preferably having from 7 to 30 carbon atoms, such as phenoxycarbonyl, p-methoxyphenoxycarbonyl, m-chlorophenoxycarbonyl, o-methoxyphenoxycarbonyl), an acylamino group (an alkylcarbonylamino group preferably having from 1 to 30 carbon atoms, such as formylamino, acetylamino, propionylamino, cyanoacetylamino; an arylcarbonylamino group preferably having from 7 to 30 carbon atoms, such as benzoylamino, p-toluylamino, pentafluorobenzoylamino, m-methoxybenzoylamino; a heterylcarbonylamino group preferably having from 4 to 30 carbon atoms, such as 2-pyridylcarbonylamino, 3-pyridylcarbonylamino, furoylamino), an alkoxycarbonylamino group (preferably having from 2 to 30 carbon atoms, such as methoxycarbonylamino, ethoxycarbonylamino, methoxyethoxycarbonylamino), an aryloxycarbonylamino group (preferably having from 7 to 30 carbon atoms, such as phenoxycarbonylamino, p-methoxyphenoxycarbonylamino, p-methylphenoxycarbonylamino, m-chlorophenoxycarbonylamino, o-chlorophenoxycarbonylamino), a sulfonylamino group (preferably having from 1 to 30 carbon atoms, such as methanesulfonylamino, benzenesulfonylamino, toluenesulfonylamino), an aminocarbonylamino group (preferably having from 1 to 30 carbon atoms, such as methylaminocarbonylamino, ethylaminocarbonylamino, anilinocarbonylamino, dimethylaminocarbonylamino), a sulfamoylamino group (preferably having from 1 to 30 carbon atoms, such as methylaminosulfonylamino, ethylaminosulfonylamino, anilinosulfonylamino), an amino group (including an anilino group and preferably having from 0 to 30 carbon atoms, such as amino, methylamino, dimethylamino, ethylamino, diethylamino, n-butylamino, anilino), an alkoxy group (preferably having from 1 to 30 carbon atoms, such as methoxy, ethoxy, n-propoxy, n-butoxy, methoxyethoxy, isopropoxy, n-dodecyloxy), an aryloxy group (preferably having from 6 to 30 carbon atoms, such as phenoxy, m-chlorophenoxy, p-methoxyphenoxy, o-methoxyphenoxy), a silyloxy group (preferably having from 3 to 30 carbon atoms such as trimethylsilyloxy, t-butyldimethylsilyloxy, cetyldimethylsilyloxy, phenyldimethylsilyloxy), a heteryloxy group (preferably having from 3 to 30 carbon atoms, such as tetrahydropyranyloxy, 3-pyridyloxy, 2-(1,3-benzimidazolyl)oxy), an arylthio group (preferably having from 6 to 30 carbon atoms, such as phenylthio), a heterylthio group (preferably having from 3 to 30 carbon atoms, such as 2-pyridylthio, 2-(1,3-benzoxazolyl)thio, 1-hexadecyl-1,2,3,4-tetrazolyl-5-thio, 1-(3-N-octadecylcarbamoyl)phenyl-1,2,3,4-tetrazolyl-5-thio), and a heterocyclic group (preferably having from 3 to 30 carbon atoms, such as:

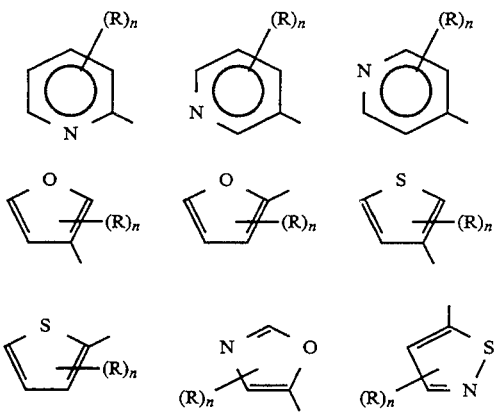

pyrrolyl, thiazolyl, imidazolyl, isoxazolyl, pyrazolyl, furazyl, pyrimidyl, indolyl).

In the preceding heterocyclic groups, R represents a hydrogen atom or a non-metallic substituent; and n represents an integer of from 1 to 4.

Preferably, R is an alkyl group having from 1 to 30 carbon atoms, an aryl group having from 6 to 30 carbon atoms, a heterocyclic group having from 2 to 30 carbon atoms, a cyano group, an alkoxy group having from 1 to 30 carbon atoms, an aryloxy group having from 6 to 30 carbon atoms, an acylamino group having from 1 to 30 carbon atoms, a carbamoyl group having from 1 to 30 carbon atoms, an oxycarbonyl group having from 2 to 30 carbon atoms, an alkoxycarbonylamino group having from 2 to 30 carbon atoms, an aryloxycarbonylamino group having from 7 to 30 carbon atoms, or an aminocarbonylamino group having from 1 to 30 carbon atoms.

Of the above-mentioned groups, B is preferably an alkyl group, an acylamino group, an alkoxycarbonylamino group, an aminocarbonylamino group, an acyl group, a sulfonyl group, a heterocyclic group, a carbamoyl group, an aryl group, a sulfonylamino group, or an aryloxycarbonylamino group.

Of the above-mentioned groups, C is preferably an aryl group, a heterocyclic group, or an alkyl group.

Of the above-mentioned groups, A is preferably an aryl group or a heteroaromatic group.

Dyes of formula (II) are explained in detail hereunder.

In formula (II), D represents a hydrogen atom, an alkyl group, an aryl group, or a heterocyclic group.

As specific examples of D, mentioned are a hydrogen atom, an alkyl group having from 1 to 20 carbon atoms (e.g., methyl, ethyl, isopropyl, butyl, methoxyethyl, cyanoethyl), an aryl group having from 6 to 20 carbon atoms (e.g., phenyl, p-tolyl, p-methoxyphenyl, p-chlorophenyl, o-methoxyphenyl, 2,4,6-trichlorophenyl), and a heterocyclic group having from 3 to 20 carbon atoms (e.g., 2-pyridyl, 3-pyridyl, 2-furyl).

E represents a substituent capable of being substituted in the pyrazole ring in the formula.

As specific examples of E, mentioned are a hydrogen atom, an alkyl group having from 1 to 20 carbon atoms (e.g., methyl, ethyl, n-butyl, t-butyl, methoxyethyl), an alkoxy group having from 1 to 20 carbon atoms (e.g., methoxy, ethoxy, isopropoxy, methoxyethoxy), an aryl group having from 6 to 25 carbon atoms (e.g., phenyl, p-tolyl, p-methoxyphenyl, p-chlorophenyl, o-methoxyphenyl), an alkoxycarbonyl group having from 2 to 20 carbon atoms (e.g., methoxycarbonyl, ethoxycarbonyl, butoxycarbonyl), a cyano group, and a carbamoyl group having from 1 to 20 carbon atoms (e.g., methylcarbamoyl, dimethylcarbamoyl, butylcarbamoyl, phenylcarbamoyl).

F represents an aryl group or a heterocyclic group.

As preferred examples of F, those mentioned for A in formula (I) are referred to.

G and I independently represent a hydrogen atom, an alkyl group, an aryl group, or a heterocyclic group.

As specific examples of G and I, mentioned are a hydrogen atom, an alkyl group having from 1 to 20 carbon atoms (e.g., methyl, ethyl, isopropyl, t-butyl), an aryl group having from 6 to 20 carbon atoms (e.g., phenyl), and a heterocyclic group having from 5 to 20 carbon atoms.

Of them, D is especially preferably an aryl group having from 6 to 10 carbon atoms; E is especially preferably an alkyl group having from 1 to 6 carbon atoms; F is especially preferably an aryl group having from 6 to 10 carbon atoms; and G and I are especially preferably both hydrogen atoms.

Where the dyes represented by formula (I) of the present invention are used as undissociated dyes, B is preferably an aryl group, a heterocyclic group, an acylamino group, a carbamoyl group or an alkyl group; C is preferably an aryl group or a heterocyclic group; A is preferably an aryl group.

A Hammett's substituent constant is referred to herein, which will be explained below. Hammett's rule is an empirical rule proposed by L. P. Hammett in 1935 for quantitatively discussing the influence of substituents on the reaction or equilibrium of benzene derivatives, which currently is widely accepted as accurate. The substituent constants to be obtained by the Hammett's rule include a $\sigma_p$ value and a $\sigma_m$ value, and these values are seen in many general literature. For instance, J. A. Dean "Lange's Handbook of Chemistry", 12th Ed., 1979 (McGraw-Hill) and "Range of Chemistry", extra issue No. 122, pp. 96–103 (1979) (Nankoh-do) describe them in detail. In the present specification, substituents are often defined or explained by way of their Hammett's substituent constant $\sigma_p$. Needless to say, such a definition or explanation does not mean that the present invention is limited to only specific substituents whose values are given in known literature such as the preceding ones but includes all substituents having the appropriate values, even though unknown, but believed to be probably within the range of the Hammett's substituent constant when measured in accordance with the Hammett's rule. A $\sigma_p$ value and a $\sigma_m$ value as referred to hereunder are defined as such.

Where the dyes represented by formula (I) of the present invention are used with dissociating their protons under a basic condition, a pKa of the dyes is preferably 7 or less, more preferably 5 or less.

Where A is an aryl group, it is necessary to be substituted by an electron-attracting group so that a pKa of the dyes represented by formula (I) of the present invention may be 7 or less. The dye having an aryl group substituted by an electron-attracting group gives higher light fastness.

Where an electron-attracting group is substituted at a p- or o-position of an azo group, a $\sigma_p$ value of Hammett's rule of the electron-attracting group is preferably 0 or more, more preferably from 0.2 to 2.0. Where an electron-attracting group is substituted at a m-position of an azo group, a $\sigma_m$ value is preferably 0 or more, more preferably from 0.2 to 2.0

Where A is a heterocyclic group, a nitrogen-containing heterocyclic group is preferred for the purpose of lowering a pKa of the dyes. Among heterocyclic groups, one substituted by an electron-attracting group is especially preferred.

A $\sigma_p$ value of Hammett's rule of the electron-attracting group is preferably 0.15 or more, more preferably 0.30 or more.

A nitrogen-containing heterocyclic group substituted by an electron-attracting group of which $\sigma_p$ value is 0.60 or more is most preferable among heterocyclic groups.

Specific examples of electron-attracting groups of which $\sigma_p$ value is 0.3 or more include an acyl group, an acyloxy group, a carbamoyl group, an alkoxycarbamoyl group, an aryloxycarbamoyl group, a cyano group, a nitro group, an alkylsulfinyl group, an arylsulfinyl group, an alkylsulfonyl group, an arylsulfonyl group, a sulfamoyl group, an alkyl halide group, an alkoxy halide group, an aryloxy halide group, an alkylthio halide group, an aryl group substituted by two or more electron-attracting groups of which $\sigma_p$ values are 0.15 or more, and a heterocyclic group.

The dyes represented by formula (I) of the present invention may have an atomic group having an anti-fading effect in the dye molecule. Such atomic group is especially preferred when the dyes are needed to form images having high fastness.

The atomic group having an anti-fading effect may be bonded to any site of A, B and C of the dyes represented by formula (I).

As the atomic group having an anti-fading effect, all those mentioned in JP-A-3-205189 can be used in the present invention. (The term "JP-A" as used herein means an "unexamined published Japanese patent application".)

Specific examples of atomic groups having an anti-fading effect are illustrated below, which, however, are not limitative.

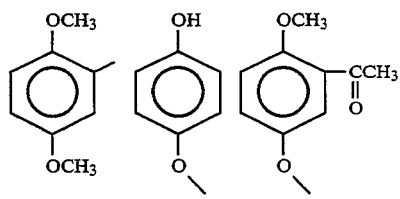

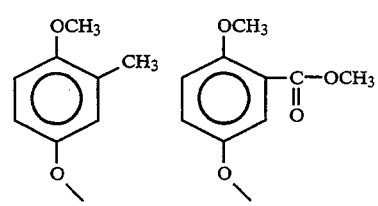

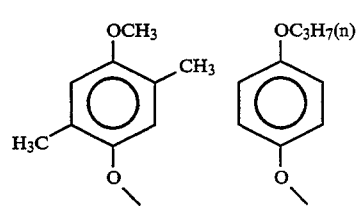

-continued

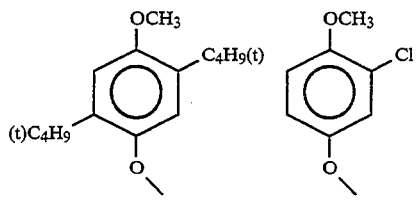

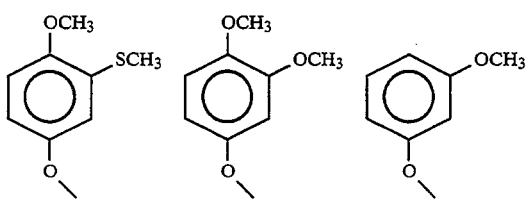

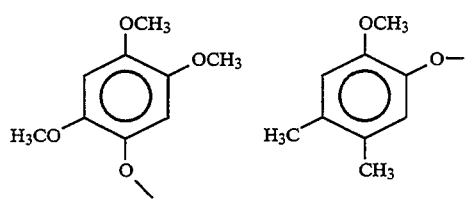

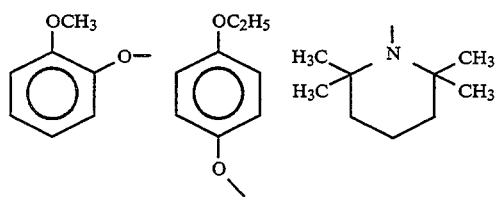

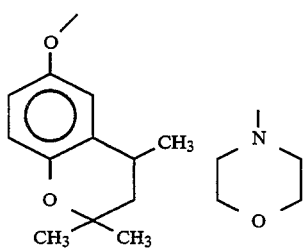

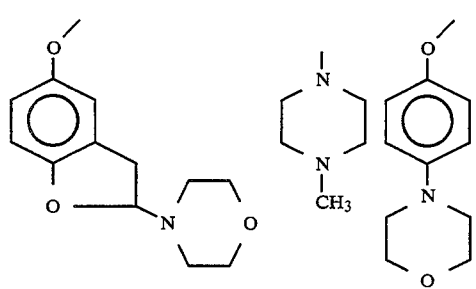

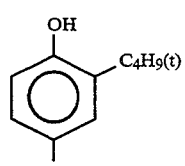

-continued
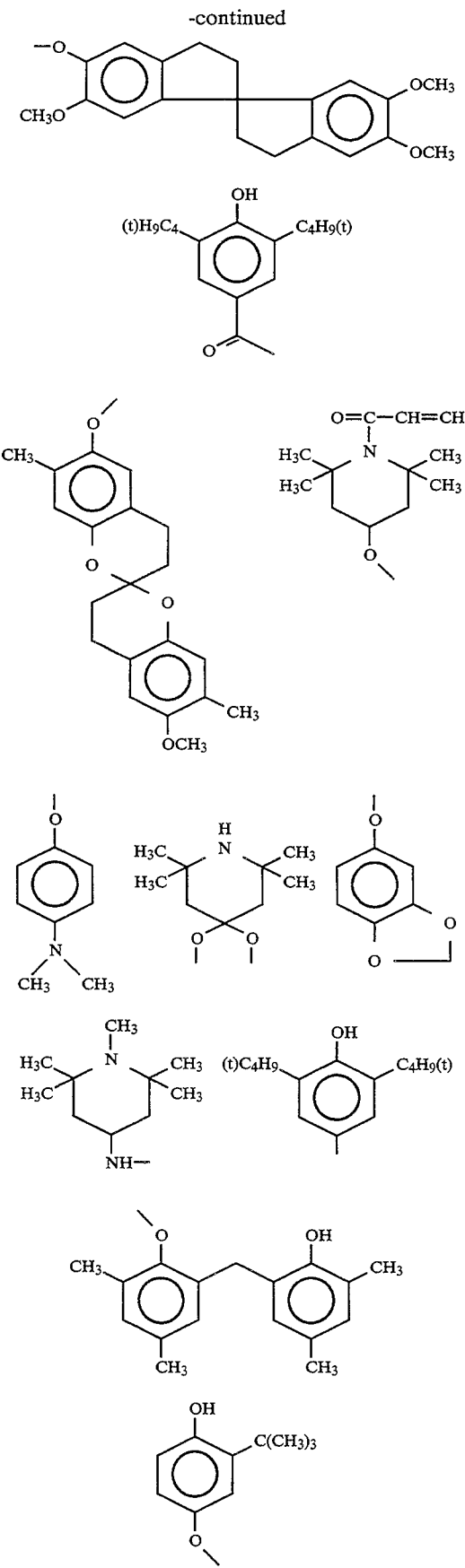
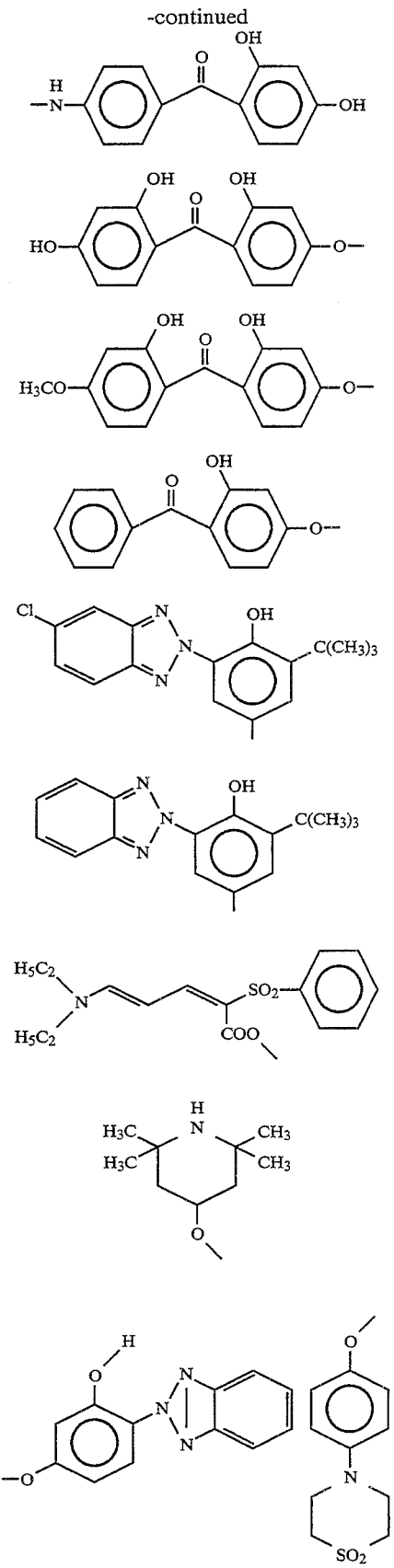
Where the dyes represented by formula (I) of the present invention are used as heat-mobile dyes, they are preferably ones having a molecular weight of 800 or less, more preferably 700 or less.

Where the dyes represented by formula (I) of the present invention are used as heat-mobile dyes, they are preferably ones not having a sulfonic acid group (or its salt) and a carboxylic acid group (or its salt) in the dye molecule.

Where the dyes represented by formula (I) of the present invention are used in a hydrophilic medium such as gelatin or water, they are preferably ones having a sulfonic acid group (or its salt), a carboxylic acid group (or its salt), an amino group or a hydroxyl group as a substituent.

Where the dyes represented by formula (I) of the present invention are present along with cyan dyes in the same location, the light fastness of the dyes is extremely improved. Therefore, a combination of the dyes represented by formula (I) of the present invention and cyan dyes is preferred, if possible.

The dyes represented by formula (I) of the present invention are preferably yellow dyes having an absorption peak wavelength of 470 nm or less.

Specific examples of the dyes represented by formula (I) of the present invention are illustrated below, which, however, are not limitative. Examples of Dyes represented by formula (I):

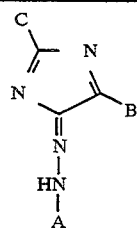

| Dye | A | B | C |
|---|---|---|---|
| 1 | 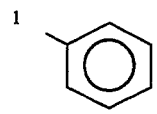 | 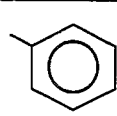 | 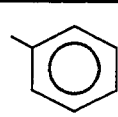 |
| 2 | 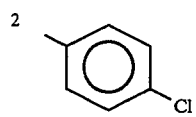 | " | " |
| 3 | 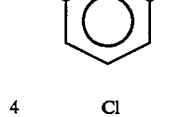 | " | " |
| 4 | 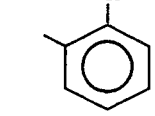 | " | " |
| 5 | 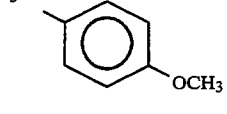 | " | " |
| 6 |  | " | " |
| 7 | 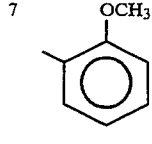 | " | " |
| 8 |  | " | " |

-continued
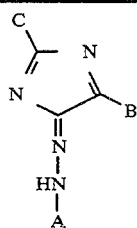
| Dye | A | B | C |
|---|---|---|---|
| 9 | 3-cyanophenyl | phenyl | phenyl |
| 10 | 2-cyanophenyl | " | " |
| 11 | 2,4-dichlorophenyl | " | " |
| 12 | 3,4-dichlorophenyl | " | " |
| 13 | 2,4,6-trichlorophenyl | " | " |
| 14 | 4-nitrophenyl | " | " |
| 15 | 3-nitrophenyl | " | " |
| 16 | 3,4-dicyanophenyl | " | " |
| 17 | 4-(N,N-diethylamino)phenyl | " | " |
| 18 | 2-methoxy-4-(N,N-diethylamino)phenyl | phenyl | phenyl |

-continued
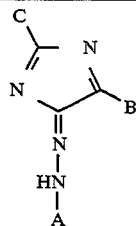
| Dye | A | B | C |
|---|---|---|---|
| 19 | 4-(2-methoxyethoxy)phenyl | " | " |
| 20 | 3-fluorophenyl | " | " |
| 21 | 4-methylphenyl | " | " |
| 22 | 4-[2-(4-methoxyphenoxy)ethoxy]phenyl | " | " |
| 23 | 4,5-dicyano-2-methyl-1-butylimidazol-yl | " | " |
| 24 | 2,4-dicyano-5-methylphenyl | " | " |
| 25 | 3-cyano-2-methyl-5-nitrothien-4-yl | " | " |
| 26 | 3-ethylthio-5-methyl-1,2,4-thiadiazol-yl | phenyl | phenyl |
| 27 | 2-methylthio-5-methyl-1,3,4-thiadiazol-yl | " | " |
| 28 | 4-cyano-5-phenyl-1-benzyl-1,2,3-triazol-yl | " | " |

-continued

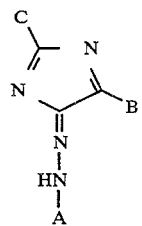

| Dye | A | B | C |
|---|---|---|---|
| 29 | phenyl-N=N-(5-thienyl with 2-methyl, 3-CN) | " | " |
| 30 | H₃CO₂S-substituted 1,2,4-thiadiazole with methyl | " | " |
| 31 | (NC)₂C=CH-(thiazole with 4-CN, 2-methyl) | " | " |
| 32 | (NC)₂C=CH-(thiophene with Cl, CN, methyl) | " | " |
| 33 | 3-methyl-4-bromo-5-methyl-isothiazole | phenyl | phenyl |
| 34 | 3-methyl-4-CN-5-methyl-isothiazole | " | " |
| 35 | 4,5-dicyano-2-methyl-thiazole | " | " |
| 36 | 2-nitro-5-methyl-3-CN-thiophene | " | " |
| 37 | 4-chloro-methylphenyl | phenyl | 5-methyl-2-chloro-thiophene |

-continued
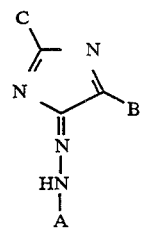
| Dye | A | B | C |
|---|---|---|---|
| 38 | 2,4-dichlorophenyl | 3-chlorophenyl | 2-thienyl |
| 39 | 4-nitrophenyl | 2-chlorophenyl | 5-(acetylamino)-2-thienyl |
| 40 | phenyl | 4-chlorophenyl | 2-pyrrolyl (NH) |
| 41 | 3-chlorophenyl | phenyl | 2-furyl |
| 42 | 4-methoxyphenyl | phenyl | 2-oxazolyl |
| 43 | phenyl | phenyl | 2-thiazolyl |
| 44 | 4-cyanophenyl | phenyl | 2-imidazolyl (NH) |
| 45 | 3,4-dicyanophenyl | phenyl | 2-oxazolyl |

-continued
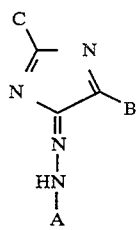
| Dye | A | B | C |
|---|---|---|---|
| 46 | phenyl | phenyl | 5-methylisoxazole |
| 47 | 4-(2-methoxyethoxy)phenyl | 2-methyl-N-pivaloylphenyl | 5-methylisothiazole |
| 48 | 3-methyl-4-cyano-5-methylisothiazole | phenyl | 5-methyl-1H-pyrazole |
| 49 | phenyl | phenyl | 3-pyridyl |
| 50 | " | " | 4-methylpyridyl |
| 51 | " | " | 2-pyridyl |
| 52 | " | " | 4-methylpyrimidyl |
| 53 | 4-chlorophenyl | phenyl | 2-hydroxy-methylphenyl |
| 54 | 3-chlorophenyl | 2-hydroxyphenyl | methylphenyl |

-continued
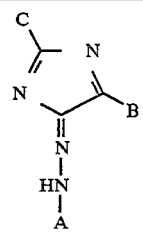
| Dye | A | B | C |
|---|---|---|---|
| 55 | 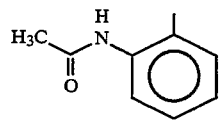 | 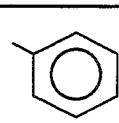 | 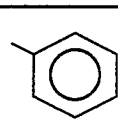 |
| 56 | 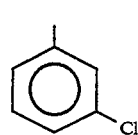 | 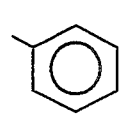 | 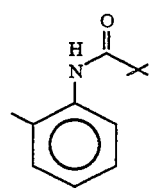 |
| 57 | 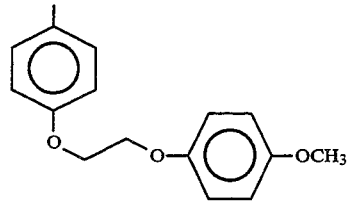 | 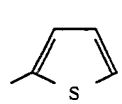 | 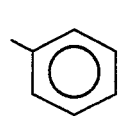 |
| 58 |  | 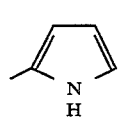 | 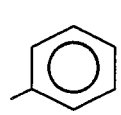 |
| 59 | 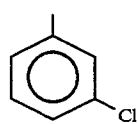 | 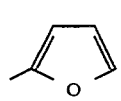 | 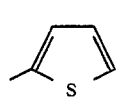 |
| 60 | 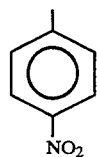 | 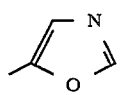 | 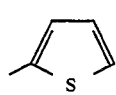 |
| 61 | 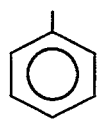 | 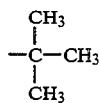 | 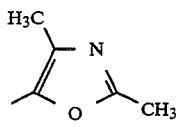 |
| 62 | 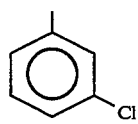 | 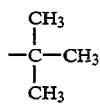 | 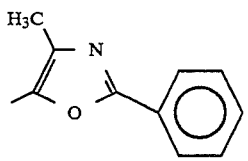 |

-continued
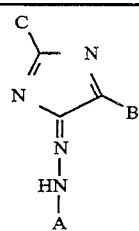
| Dye | A | B | C |
|---|---|---|---|
| 63 | 2,4,6-tricyanophenyl (NC, CN, CN substituents) | —C(=O)OEt | 2-thienyl |
| 64 | phenyl | —C(=O)NH—CH(CH3)— (acetamido isopropyl) | phenyl |
| 65 | 2-fluorophenyl | —SO2—phenyl | 2-pyridyl |
| 66 | 4-methoxyphenyl | —NH—C(=O)—phenyl | phenyl |
| 67 | 4-chlorophenyl | —CN | phenyl |
| 68 | phenyl | —CF3 | tert-butyl (C(CH3)3) |
| 69 | 3-chlorophenyl | —C(=O)CH3 | phenyl |
| 70 | phenyl | —C(CH3)3 | —C(CH3)3 |
| 71 | phenyl | —C(=O)NH—CH2CH2—O—C6H4—OCH3 | phenyl |

-continued
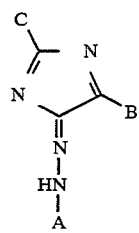
| Dye | A | B | C |
|---|---|---|---|
| 72 | 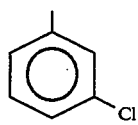 | 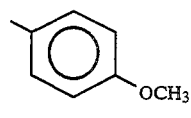 | 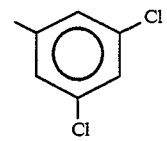 |
| 73 | 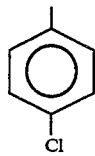 | 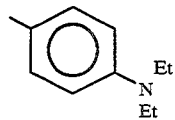 | 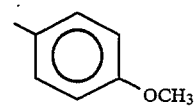 |
| 74 | 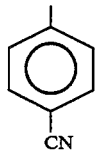 | 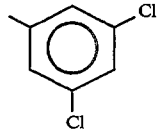 | 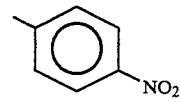 |
| 75 | 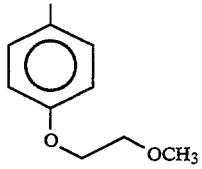 | 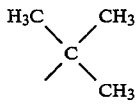 | 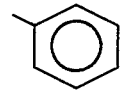 |
| 76 | | 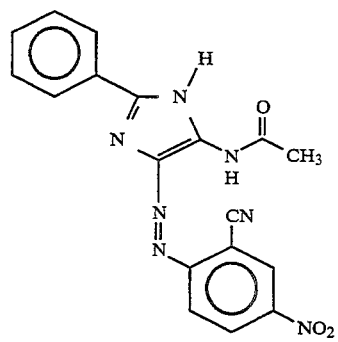 | |

-continued
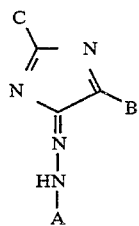
| Dye | A | B | C |
|---|---|---|---|
| 77 | | 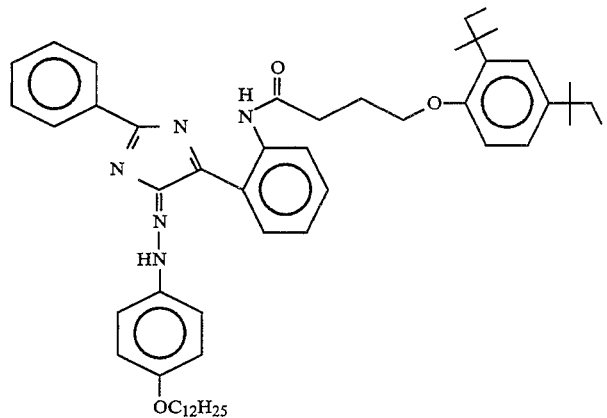 | |
| 78 | | 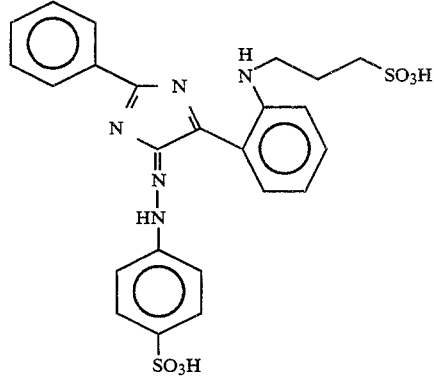 | |
| 79 | | 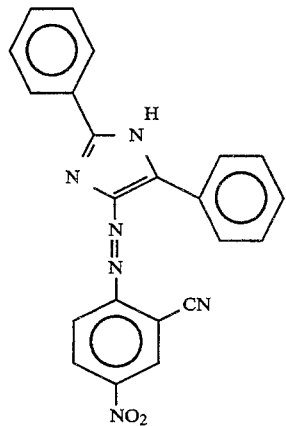 | |

-continued
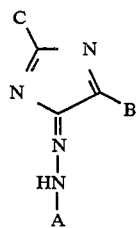
| Dye A | B | C |
|---|---|---|
| 80 | 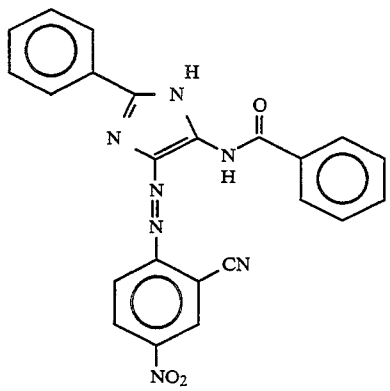 | |
| 81 | 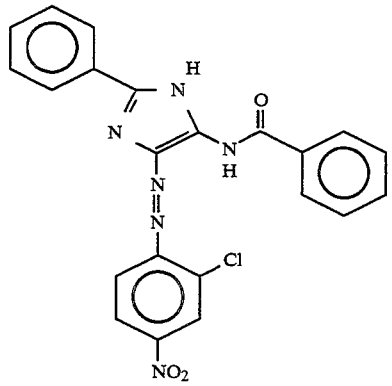 | |
| 82 | 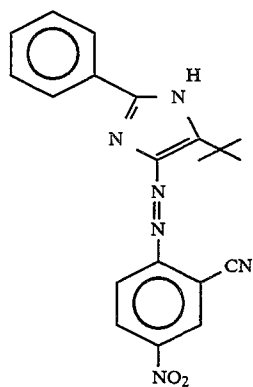 | |

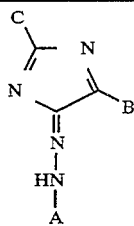
| Dye | A | B | C |
|---|---|---|---|
| 83 | | 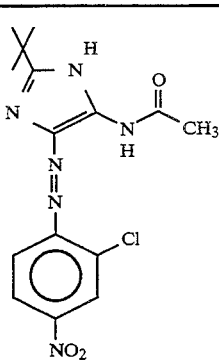 | |
Specific examples of dyes represented by formula (II) for use in the present invention are illustrated below, which, however, are not limitative.
| Dye | D | E | F | G | I |
|---|---|---|---|---|---|
| a | ![phenyl] | —CH$_3$ | ![4-nitrophenyl] | H | H |
| b | " | " | ![4-cyanophenyl] | " | " |
| c | " | " | ![4-methylsulfonylphenyl] | " | " |
| d | " | " | ![3,4-dicyanophenyl] | " | " |
| e | " | " | ![3-cyano-4-methylsulfonylphenyl] | " | " |
| f | " | " | ![3,4-dicyanophenyl variant] | " | " |

-continued

| Dye | D | E | F | G | I |
|---|---|---|---|---|---|
| g | 2,3,5-trichlorophenyl | tert-butyl (H3C)3C- | 2,4-dichlorophenyl | " | " |
| h | 2,4-dichlorophenyl | " | 4-nitrophenyl | " | " |
| i | 4-(ethoxycarbonyl)phenyl | " | 4-nitrophenyl | " | " |
| j | phenyl | " | 4-nitrophenyl | " | " |
| k | 4-chlorophenyl | tert-butyl (H3C)3C- | 4-nitrophenyl | H | H |
| l | 3-chlorophenyl | tert-butyl (H3C)3C- | " | " | " |
| m | benzyl (-CH2-C6H5) | phenyl | " | " | " |
| n | phenyl | 2-chlorophenyl | " | " | " |
| o | 2,5-dimethylphenyl | 2,4,6-trimethylphenyl | " | " | " |
| p | phenyl | tert-butyl (H3C)3C- | 2-(methylthio)-1,3,4-thiadiazol-5-yl | " | " |

The dyes represented by formula (I) of the present invention are prepared by diazo-coupling of the following coupler component (a) and the following diazo compound (b).

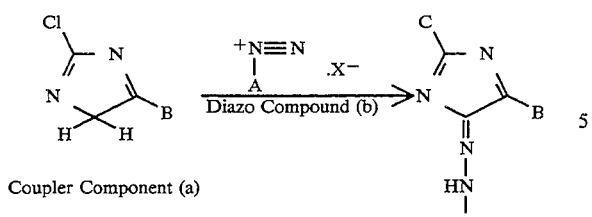

Coupler Component (a)

In the reaction scheme, X⁻ is a monovalent anion such as a Cl⁻ ion. The coupler component (a) may be in the form of a tautomeric isomer of the illustrated formula.

Production of the dyes represented by formula (I) of the present invention is described below, with reference to the following production examples. The coupler component to be used in producing the dyes of the present invention may be prepared with ease by known methods. For instance, JP-A-2-53866 and JP-A-63-113077 can be referred to.

PRODUCTION EXAMPLE 1

Production of Dye 3

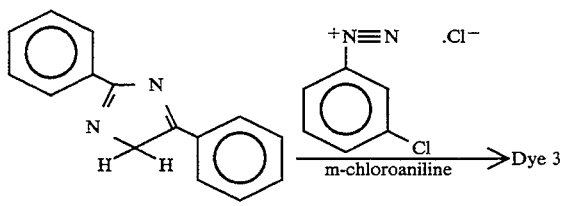

Coupler Component (c)

2.4 ml of concentrated hydrochloric acid, 2.4 ml of water and 1.0 g of m-chloroaniline were stirred while cooling with ice, to which 0.60 g of sodium nitrite was gradually added at an internal temperature of 10° C. This was stirred for 10 minutes to prepare a diazo liquid of m-chloroaniline.

The diazo liquid was gradually and dropwise added to a mixture of 1.20 g of coupler component (c), 20 ml of methanol and 5.0 g of sodium acetate with stirring while ice-cooling. The components were then allowed to react for 30 minutes. After 30 minutes, crystals of the product precipitated out, which were taken out by filtration. Subsequently, the crude crystals were recrystallized with 10 ml of methanol. After filtration, the crystals were washed with methanol and dried. 1.20 g of dye 3 was obtained.

Yield: 61.4%. m.p.: 191° to 193° C.

¹HNMR (in CDCl₃): 7.35–7.65 (m, 8H), 7.75 (m, 1H), 7.90 (m, 1H), 8.00–8.10 (m, 2H), 8.30–8.50 (m, 2H).

PRODUCTION EXAMPLE 2

Production of Dye 5

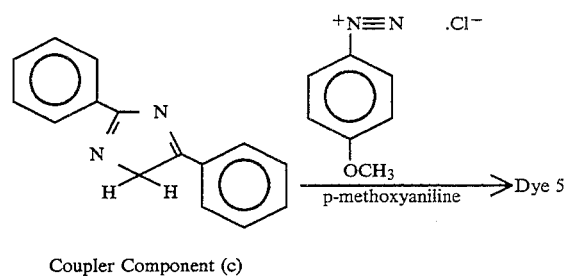

Coupler Component (c)

Diazo liquid of p-methoxyaniline was prepared from 4.56 ml of concentrated hydrochloric acid, 4.56 ml of water, 1.68 g of p-methoxyaniline and 1.0 g of sodium nitrite in the same manner as in Production Example 1.

The diazo liquid was gradually and dropwise added to a mixture of 1.5 g of coupler component (c), 20 ml of methanol and 5.0 g of sodium acetate with stirring while ice-cooling. The components were then reacted for 30 minutes, whereupon crystals of the product precipitated out and they were taken out by filtration. Subsequently, the crude crystals were recrystallized with 50 ml of methanol. After filtration, the crystals were washed with methanol and dried. 1.50 g of dye 5 was obtained.

Yield: 62.1%. m.p.: 188° C.

¹HNMR (in CDCl₃): 3.90 (s, 3H), 7.05 (d, 2H, J=9 Hz), 7.30–7.60 (m, 6H), 7,90 (d, 2H, J=9 Hz), 8.05 (d, d, 2H, J₁=9 Hz, J₂=2 Hz), 8.40 (d, 2H, J=9 Hz).

The other dye compounds 1, 2, 4 and 6 to 83 were also produced with ease in the same manner as in Production Examples 1 and 2.

Physical values of the dyes represented by formula (I) of the present invention produced above are shown below, so as to further explain them.

| Dye | $\epsilon_{max}$ (1 · mol⁻¹ · cm⁻¹) |
|---|---|
| | Absorption Peak Wavelength in Ethyl Acetate (nm) |
| Dye 3 | 423 | 2.52 × 10⁴ |
| Dye 5 | 441 | 2.76 × 10⁴ |
| Dye 79 | 493 | 3.04 × 10⁴ |
| Dye 80 | 502 | 2.39 × 10⁴ |
| | Absorption Peak Wavelength in Dimethylformamide to which Trimethylamine is added (nm) |
| Dye 79 | 597 | 4.85 × 10⁴ |
| Dye 80 | 590 | 5.80 × 10⁴ |

The dyes represented by formula (II) of the present invention can be produced in the same manner as described in U.S. Pat. No. 4,987,837.

The heat-mobile dyes represented by formulae (I) and (II) of the present invention are incorporated into a dye-donating layer on a support to give a thermal transfer dye-donating material, which is used in formation of an image by thermal transfer.

The case of using the heat-mobile dyes of the present invention in image formation by thermal transfer will be explained in detail hereunder.

In general, for forming a full color image, three dyes of yellow, magenta and cyan are necessary.

The protons of the dyes of the present invention do not dissociate under a neutral or acidic condition. In such a case, since the absorption peak thereof exists in a short wavelength region, the dyes of the present invention are preferably used as yellow dyes or red dyes.

The dye of the present invention may be used as a yellow dye and the other two dyes may be selected from known dyes for forming a full color image, or two dyes of yellow and magenta may be selected from the dyes of the present invention and a cyan dye may be selected from known dyes.

The dyes of the present invention dissociate their protons under a basic condition, whereby an absorption peak is shifted to a long wavelength region and, at the same time, an absorption curve is sharpen. Accordingly, under a basic condition, the dyes of the present invention are preferably used as cyan dyes.

The dye of the present invention may be used as a cyan dye and the other dyes may be selected from known dyes for forming a full color image, or two dyes of cyan and magenta may be selected from the dyes of the present invention and a yellow dye may be selected from known dyes.

Where the dyes represented by formula (I) of the present invention are used under an undissociated condition, they are preferably used as yellow dyes. On the other hand, where they are used under a dissociated condition, they are preferably used as cyan dyes.

The dye of the present invention and a known dye may be combined to give one and the same color. Two or more of the dyes of the present invention may be mixed to give the same color.

Use of the heat-mobile dyes represented by formulae (I) and (II) of the present invention are mentioned below.

The thermal transfer dye-donating material of the present invention may be in any form including a sheet or a long roll or ribbon. The cyan dyes and magenta dyes of the present invention and the other yellow dyes which are combined with them are generally positioned on a support in such a way that they separately form independent regions. For instance, a yellow dye region, a magenta dye region and a cyan dye region are positioned on a support either in plane order or in line order. Alternatively, a yellow dye, a magenta dye and a cyan dye may be provided separately on different supports to prepare three thermal transfer dye-donating materials; and thermal transfer of the dyes may be effected from them in order to a thermal transfer dye-receiving material.

The dyes of the present invention and other dyes to be combined with them may be dissolved or dispersed in a pertinent solvent along with a binder resin and then coated on a support, or alternatively, the resulting solution or dispersion may be printed on a support, for example, by gravure printing. The thickness of the dye-donating layer containing such dyes is generally from about 0.2 μm to about 5 μm, especially from 0.4 μm to 2 μm, as a dry thickness.

The amount of the dyes represented by formula (I) of the present invention to be coated is preferably from 0.03 to 1.0 g/m², more preferably from 0.1 to 0.6 g/m².

Where the dyes represented by formula (I) are used in combination with the dyes represented by formula (II), the total amount of the dyes to be coated is also preferably from 0.03 to 1.0 g/m². Further, the mixing ratio thereof is preferably from 1/9 to 9/1, more preferably ⅓ to 3/1, by weight.

As the binder resin to be used along with the above-mentioned dyes for the purpose, any known binder resins are usable. In general, those which have a high heat-resistance and which do not interfere with transfer of dyes under heat are selected. For instance, examples of usable binder resins include polyamide resins, polyester resins, epoxy resins, polyurethane resins, polyacrylic resins (for example, polymethyl methacrylate, polyacrylamide, polystyrene-2-acrylonitrile), vinyl resins (for example, polyvinyl pyrrolidone), polyvinyl chloride resins (for example, vinyl chloride-vinyl acetate copolymer), polycarbonate resins, polystyrene-polyphenylene oxides, cellulose resins (for example, methyl cellulose, ethyl cellulose, carboxymethyl cellulose, cellulose acetate hydrogen phthalate, cellulose acetate, cellulose acetate propionate, cellulose acetate butyrate, cellulose triacetate), polyvinyl alcohol resins (for example, polyvinyl alcohol, and partially saponified polyvinyl alcohols such as polyvinyl acetal and polyvinyl butyral), petroleum resins, rosin derivatives, chroman-indene resins, terpene resins, and polyolefin resins (for example, polyethylene, polypropylene).

The amount of the binder resin to be used in the present invention is preferably from about 20 to about 600 parts by weight to 100 parts by weight of dye.

An ink solvent, which may be any known one, is used for dissolving or dispersing the above-mentioned dyes and binder resins, in the present invention.

As a support for the thermal transfer dye-donating material of the present invention, any known ones can be used. For instance, there are mentioned, as usable supports, polyethylene terephthalate, polyamides, polycarbonates, glassine paper, condenser paper, cellulose esters, fluorine polymers, polyethers, polyacetals, polyolefins, polyimides, polyphenylenesulfide, polypropylene, polysulfone, and cellophane.

The thickness of the support of the thermal transfer dye-donating material of the present invention is generally from 2 to 30 μm.

For the purpose of preventing a thermal head from sticking to the surface of the dye donating material, a slipping layer may be provided. Such a slipping layer may be composed of a lubricating substance containing or not containing a polymer binder, for example, a surfactant or a solid or liquid lubricant or a mixture of them.

It is recommended that the dye-donating material is subjected to sticking preventing treatment on the surface of the support not coated with the dye donating layer, for the purpose of preventing the material from sticking to a thermal head due to the heat of the head in the printing process where a heated thermal head is applied to the material from the back surface thereof, and of improving the slidability of a thermal head on the surface of the material.

The dye-donating material of the present invention may have a hydrophilic barrier layer for the purpose of preventing diffusion of dyes in the direction of the support. Such a hydrophilic dye-barrier layer contains a hydrophilic substance useful for the intended purpose.

The dye-donating material of the present invention may have a subbing layer.

The thermal transfer dye-donating material of the present invention is attached to a thermal transfer image receiving material, and heat energy is imparted to any one of the attached materials, preferably to the back surface of the thermal transfer dye-donating material by a heating means, for example, with a thermal head or the like in accordance with any desired image information, whereby the dye being in the dye-donating layer may be transferred to the thermal transfer image-receiving material in accordance with the degree of the heat energy imparted to the attached materials. As a result, a color image having high sharpness and sufficient gradation with good resolution can be formed on the image-receiving material. The anti-fading agent to be in the thermal transfer dye-donating material may also be transferred to the image-receiving material in the same manner.

The heating means to be employed in the image formation is not limited to only such a thermal head but any other known means such as laser rays (for example, semiconductor laser rays), infrared flash, and hot pen may also be used.

In the case of the method of using a laser as the heat source, it is desirable that the thermal transfer dye-donating material contains a substance which strongly absorbs laser rays. Where laser rays are irradiated to the thermal transfer dye-donating material of the present invention, the absorbing substance contained in the material may convert the light energy to heat energy and transmit the thus converted heat to the adjacent dye, whereby the dye is heated up to a temperature at which it is transferred to a thermal transfer image-receiving material.

Such an absorbing substance is in a layer provided below the dye in the material, and/or it may be blended with the dye to be in the material.

The details of the process are described in British Patent 2,083,726A.

As the above-mentioned lasers, several kinds of lasers are usable. Especially preferred are semiconductor lasers in view of the small size, low cost, stability, reliability, durability and ease of modulation.

The thermal transfer dye-donating material of the present invention is combined with a thermal transfer image-receiving material and can be used in various fields of printing and facsimile using various thermal printing systems, formation of image prints by magnetic recording systems, photomagnetic recording systems or optical recording systems, and formation of print images from television or CRT image plane.

Regarding the details of such thermal transfer recording methods, the description in JP-A-60-34895 is referred to.

The thermal transfer image-receiving material to be used in combination with the thermal transfer dye-donating material of the present invention is one having an image-receiving layer on a support, the layer receiving the dyes to be transferred from the thermal transfer dye-donating material. The image-receiving layer is preferably one which contains a substance capable of receiving the dyes transferred from the thermal transfer dye-donating material during printing and of fixing the thus transferred dyes in the layer, singly or along with any other binder substance, and the layer preferably has a thickness of approximately from 0.5 to 50 μm. As specific examples of substances which may be in such an image-receiving layer for receiving dyes to be transferred thereto from the thermal transfer dye-donating material, polymers of the following resins are referred to.

(A) Resins having ester bonds: Polyester resins.
(B) Resins having urethane bonds: Polyurethane resins.
(C) Resins having amido bonds: Polyamide resins.
(D) Resins having urea bonds: Urea resins.
(E) Resins having sulfone bonds: Polysulfone resins.
(F) Other resins having high polar bonds: Polycaprolactone resins, styrene-maleic anhydride resins, polyvinyl chloride resins, and polyacrylonitrile resins.

In addition to the above-mentioned resins, mixtures of them as well as copolymers of them may also be used.

The thermal transfer image-receiving material may contain, especially in the image-receiving layer, a high boiling point organic solvent or a thermomelting solvent as a substance for accepting the dye transferred from the thermal transfer dye-donating material of the present invention or as a promoter for diffusion of the dye.

The thermal transfer image-receiving material may contain a mordant and a basic material to mordant a dye. A basic material may be inorganic or organic. Specific examples of inorganic basic materials include hydroxides of metals and salts thereof. Specific examples of organic basic materials include nitrogen-containing heterocyclic compounds and amines.

In the basic materials, amines are preferably used. Specific examples of amines include a primary amine (e.g., aniline, n-butylamine, octylamine), a secondary amine (e.g., methylaniline, ethylaniline, dibutylamine), and a tertiary amine (e.g., tributylamine, trioctylamine). Amines may be a polymer having an amino group as a partial structure.

Specific examples of polymers having an amino group and a mordant are described in JP-A-1-188391, JP-A-3-83685 and JP-A-61-64492. AEA (Sankyo Co., LTD.), which is a polyvinylacetal having an amino group, is preferable as a basic polymer.

As a polymer having an amino group, a polymer having a repeating unit such as the following formula (III) is preferably used:

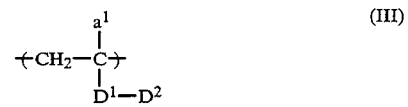

where $a^1$ represents a hydrogen atom, a halogen atom, a cyano group, or an alkyl group having from 1 to 4 carbon atoms; $D^1$ represents a divalent group connecting a carbon atom with $D^2$ or a single bond (no connecting group); $D^2$ represents a tertiary amino group, a nitrogen-containing heterocyclic group, or a quaternary cation group.

As specific examples of $a^1$, mentioned are a hydrogen atom, a halogen atom (e.g., a chloride atom, a bromide atom), a cyano group, and an alkyl group having from 1 to 4 carbon atoms (e.g., methyl, ethyl, propyl, butyl). $a^1$ is preferably a hydrogen atom and a methyl group.

As specific examples of $D^1$, mentioned are the group selected from or the groups constituted in the combination of —OCO—, —COO—, —(CH$_2$)$_v$—, —SO$_2$—, —COO(CH$_2$)$_v$—, —OCO—(CH$_2$)$_v$— (v represents an integer from 1 to 3), —O—, —CONH—, —CON(R$^1$)—, —SO$_2$N(R$^1$)—, CONHCONH—, CONHCOO—, —C$_6$H$_4$— and

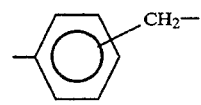

($R^1$ represents an alkyl group or an aryl group).

Where D¹ is —C₆H₄—, the benzene ring may be substituted. Specific examples of substituents include a halogen atom (e.g., a chloride atom, a bromide atom), an alkyl group (e.g., methyl, ethyl, propyl, butyl, chloromethyl, methoxymethyl), and an alkoxy group (e.g., methoxy, ethoxy, propioxy, buthoxy).

D¹ is preferably —OCO—, —OCO—(CH₂)$_r$—, —COO(CH₂)$_r$—, —CH₂—, and

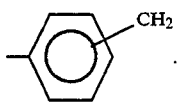

Where D² is a tertiary amino group, the tertiary amino group is represented by —N(D⁴)D⁵. D⁴ and D⁵ independently are the same as those defined in R¹. D⁴ and D⁵ may form a cyclic structure. The cyclic structure represents 5- or 6-membered ring structure which may contain an oxygen atom, a nitrogen atom or a sulfur atom. Preferably, D⁴ and D⁵ are independently an alkyl group having from 1 to 6 carbon atoms or a benzyl group.

Where D² is a nitrogen-containing heterocyclic group, an imidazole group and a pyridine group are preferable as a nitrogen-containing heterocyclic group. These groups may be substituted by, for example, the group defined in R¹ mentioned above.

Where D² is a quaternary cation group, mentioned are a quaternary ammonium group and a quaternary imidazole group as a quaternary cation group. A quaternary ammonium group is represented by formula (IV):

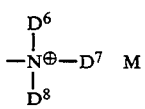

where D⁶, D⁷, and D⁸ are independently the same as those defined in R¹; D⁶ and D⁷, D⁷ and D⁸, or D⁶ and D⁸ may independently form a cyclic structure which is the same as those defined in the cyclic structure of D⁴ and D⁵; and M represents an anion which neutralizes a cation electric charge in substituents. As an anion, either an inorganic anion or an organic anion can be used. Preferred are a perchlorate ion, an iodine ion, a bromine ion, and a substituted arylsulfonate ion such as a p-toluenesulfonate ion.

Preferably, D⁶, D⁷, and D⁸ are independently an alkyl group having from 1 to 6 carbon atoms or a benzyl group.

As a quaternary imidazole group, the following formula (V) is mentioned:

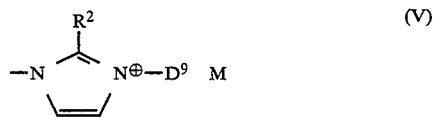

where D⁹ is the same as defined in R¹; M is the same as defined in above-mentioned M; and R² is a hydrogen atom, an alkyl group, or an aryl group, preferably a substituted or unsubstituted alkyl group.

The repeating unit shown in formula (III) contained is 10% to 100% in the polymer.

As a polymer component which is contained in the polymer together with the polymer component shown by formula (III), any monomer capable of copolymerizing with the polymer component of formula (III) may be used. Preferred is a vinyl compound such as methacrylate esters, acrylate esters, styrenes, heterocyclic vinyls.

These other monomers are used in the range within 90 mol % of all polymer components of the polymer. The repeating unit shown by formula (III) and the other copolymer components may exist in a random form or in a block form in the polymer.

Specific examples of polymers having an amino group used in the present invention are illustrated below, which, however, are not limitative.

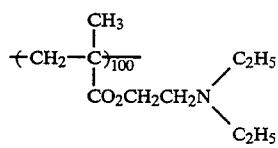

P-1

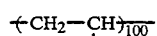

P-2

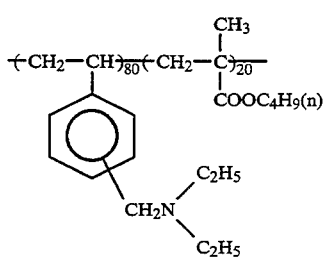

P-3

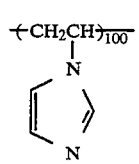

P-4

-continued

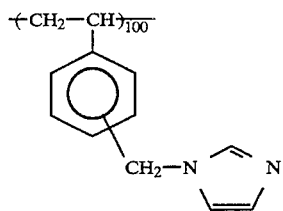 P-5

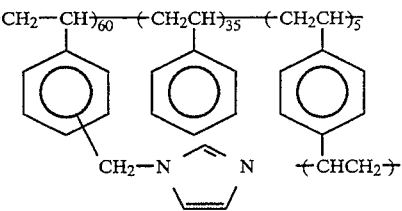 P-6

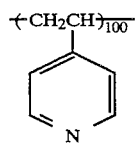 P-7

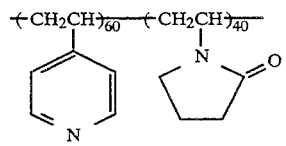 P-8

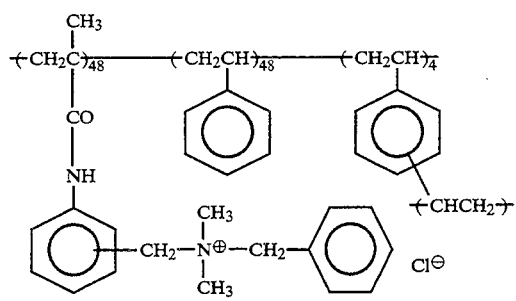 P-9

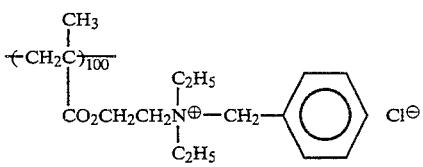 P-10

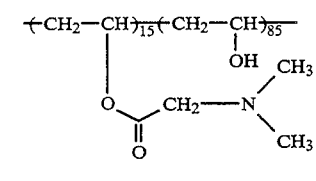 P-11

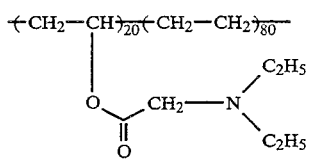 P-12

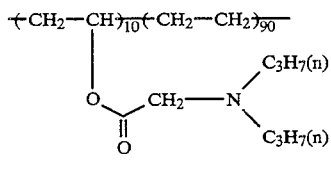 P-13

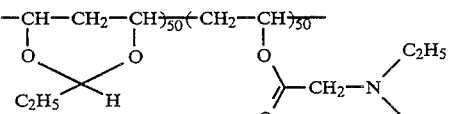 P-14

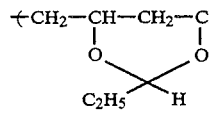 P-15

The image-receiving layer of the thermal transfer image-receiving material may have the substance capable of accepting the transferred dye in the form of a dispersion dispersed in a water-soluble binder. As such a water-soluble binder, any known various water-soluble polymers can be used. Preferred are water-soluble polymers having groups capable of being crosslinked with a hardening agent.

The image-receiving layer may be composed of two or more layers. In this case, it is desired that the layer nearer to the support is made of a synthetic resin having a lower glass transition point or contains a high boiling point organic solvent or a thermomelting solvent for the purpose of elevating the fixability of the transferred dye in the layer. At the same time, the outermost layer is made of a synthetic resin having a higher glass transition point and contains a minimum amount of a high boiling point organic solvent or a thermomelting solvent or contains neither a high boiling point organic solvent nor a thermomelting solvent for the purpose of preventing various disorders or accidents of stickiness of the surface, adhesion of the surface to other substances, retransfer of the once transferred dye to other substances, and blocking of the surface with the thermal transfer dye-donating material attached thereto.

The total thickness of the image-receiving layer is desirably within the range of from 0.5 to 50 μm, especially preferably from 3 to 30 μm. Where the image-receiving layer is composed of two layers, the thickness of the outermost layer is preferably within the range of from 0.1 to 2 μm, especially preferably from 0.2 to 1 μm.

The image-receiving layer may optionally contain a dye-fixing agent. As such a dye-fixing agent, any of the mordant agents described in JP-A-3-83685 and those described in JP-A-1-188391 are usable.

The thermal transfer image-receiving material usable in the present invention may have an interlayer between the support and the image-receiving layer.

Such an interlayer may be any one of a cushion layer, a porous layer or a dye diffusion preventing layer, or a layer having two or more functions of such layers. As the case may be, it may also have a role as an adhesive layer.

As a material of the support constituting the thermal transfer image-receiving material for use in the present invention, any one which is durable and resistant to the transferring temperature and which satisfies all the necessary conditions of smoothness, whiteness, slidability, friction property, antistatic property and depression after transfer may be used.

The thermal transfer image-receiving material for use in the present invention may contain a brightening agent, optionally along with an anti-fading agent.

For the purpose of improving the releasability of the thermal transfer dye-donating material of the present invention from the thermal transfer image-receiving material to be applied to the former material, after the thermal transfer process, a releasing agent is desirably incorporated into the layer constituting the dye-donating material and/or the layer constituting the image-receiving material, especially preferably into the outermost layers of both materials facing each other.

The layers constituting the thermal transfer dye-donating material of the present invention as well as those constituting the thermal transfer image-receiving material to be applied to the former material may be hardened with a hardening agent.

As examples of such a hardening agent, mentioned are vinylsulfone hardening agents (e.g., N,N'-ethylenebis(vinylsulfonylacetamido)ethane), N-methylol hardening agents (e.g., dimethylol urea), as well as high molecular hardening agents (e.g., compounds described in JP-A-62-234157).

The thermal transfer dye-donating material of the invention and the thermal transfer image-receiving material applicable to the former material may contain an anti-fading agent. Such an anti-fading agent includes, for example, an antioxidant, an ultraviolet absorbent as well as metal complexes of a certain kind.

The anti-fading agent having a function of preventing the transferred dyes from fading may be previously added to the image-receiving material or, alternatively, it may be supplied later to the material from an external source, for example, by transferring it from the dye-donating material attached to the image-receiving material.

The above-mentioned antioxidant, ultraviolet absorbent and metal complex can be used in combination.

The layers constituting the thermal transfer dye-donating material of the present invention and those constituting the thermal transfer image-receiving material to be applied to the former material may contain various surfactants as a coating aid as well as for the purpose of improving the releasability, improving the sliding property, preventing static charges and accelerating the developability.

The layers constituting the thermal transfer dye-donating material of the present invention and those constituting the thermal transfer image-receiving material to be applied to the former material may contain organic fluoro-compounds for the purpose of improving the sliding property, preventing static charges and improving the releasability.

The thermal transfer dye-donating material of the present invention and the thermal transfer image receiving material to be applied to the former material may contain a mat agent.

The receiving layer may also contain an isocyanate having three or more functional groups and an isocyanate having one functional group.

Isocyanate compounds having three or more functional groups which may form a three-dimensional structure by a crosslinking reaction of polyesters are effective to prevent fusing. Trimethylolpropane reaction products of hexamethylenediisocyanate and biuret aggregate of hexamethylenediisocyanate are excellent. Also, trimethylolpropane reaction products of isophoronediisocyanate and isocyanurate aggregate of isophoronediisocyanate have satisfactory properties.

Although aromatic isocyanate compounds are excellent in reactivity, image-receiving materials are faintly yellowed. Accordingly, aliphatic isocyanate compounds are more preferable than aromatic ones.

Specific examples of isocyanate compounds having three or more functional groups include commercially available products such as Polyisocyanate KP-90 (product by Dainippon Ink and Chemicals, Inc.), Colonate HL (product by Nippon Polyurethane Industry, Co., Ltd.), Takenate D120N (Takeda Chemical Industries, Ltd.), Sumidur IL (Sumitomo Chemical Co., Ltd.), Dismodur Z4370 (Sumitomo Bayer Co., Ltd.), Colonate EH (Nippon Polyurethane Industry, Co., Ltd.), Sumidur N (Sumitomo Chemical Co., Ltd.).

As an isocyanate compound having one functional group, compounds represented by following formula (VI) are mentioned:

$$S-NCO \qquad (VI)$$

where S represents a substituted or unsubstituted alkyl group or aralkyl group.

S is preferably an alkyl group having 6 or more carbon atoms, more preferably an alkyl group having from 8 to 20 carbon atoms.

The isocyanate compound having one functional group used in the present invention is preferably one having a high reactivity to a hydroxyl group of polyesters and being able to react rapidly with an isocyanate compound having three or more functional groups so as to prevent the decrease in transfer density. Accordingly a lower alkylisocyanate such as methylisocyanate, ethylisocyanate is preferable. Considering a volatility, a irritating odor and safety, an alkylisocyanate having 6 or more carbon atoms is preferable. An alkylisocyanate having from 8 to 20 carbon atoms is especially preferable.

Specific examples of isocyanates having one functional group include n-hexylisocyanate, cyclohexylisocyanate, phenylethylisocyanate, n-octylisocyanate, n-nonylisocyanate, n-dodecylisocyanate, and n-octadecylisocyanate.

The method of using an isocyanate compound having one functional group and an isocyanate compound having 3 or more functional groups of the present invention is preferably that, after an isocyanate compound having one functional group added to a polyester resin so as to react with a hydroxyl residue of polyester resin, an isocyanate compound having three or more functional groups is added thereto, then it is coated on a support.

Excess crosslinking due to an isocyanate compound having 3 or more functional groups is inhibited by the reacting of an isocyanate compound having one functional group with a polyester resin, whereby a high transfer density is maintained.

When an isocyanate compound having 3 or more functional groups reacts with a polyester resin, the transfer density lowers. However, the sole use of an isocyanate compound having one functional group is insufficient to the effect of preventing fusing. The addition of an isocyanate compound having 3 or more functional groups is indispensable to prevent fusing.

The amount of isocyanate having one functional group to be added is from 1 to 5 equivalent(s), more preferably from 1 to 3 equivalent(s), to the amount of hydroxyl groups contained in a polyester resin to be added. The amount of isocyanate having 3 or more functional groups is from 0.01 g/m² to 10 g/m², preferably from 0.1 g/m² to 5 g/m², more preferably 1.0 g/m² to 2.0 g/m².

The present invention will be explained in more detail by way of the following examples, which, however, are not intended to restrict the scope of the present invention.

Figure 2:
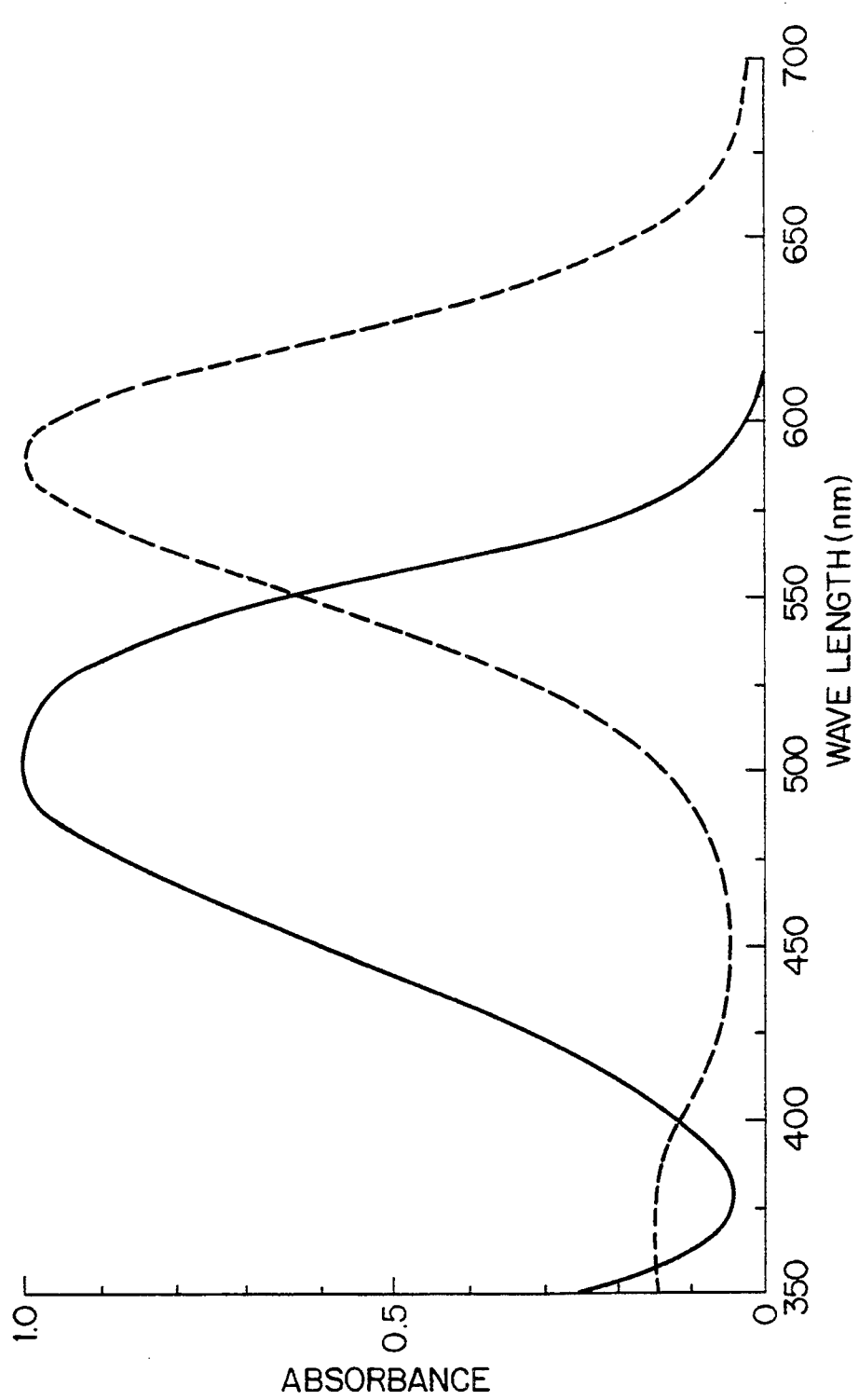
FIG. 2 shows absorption spectra of dye 80 of the present invention in ethyl acetate (solid line) and in dimethylformamide to which triethylamine is added (broken line).
Figure 3:
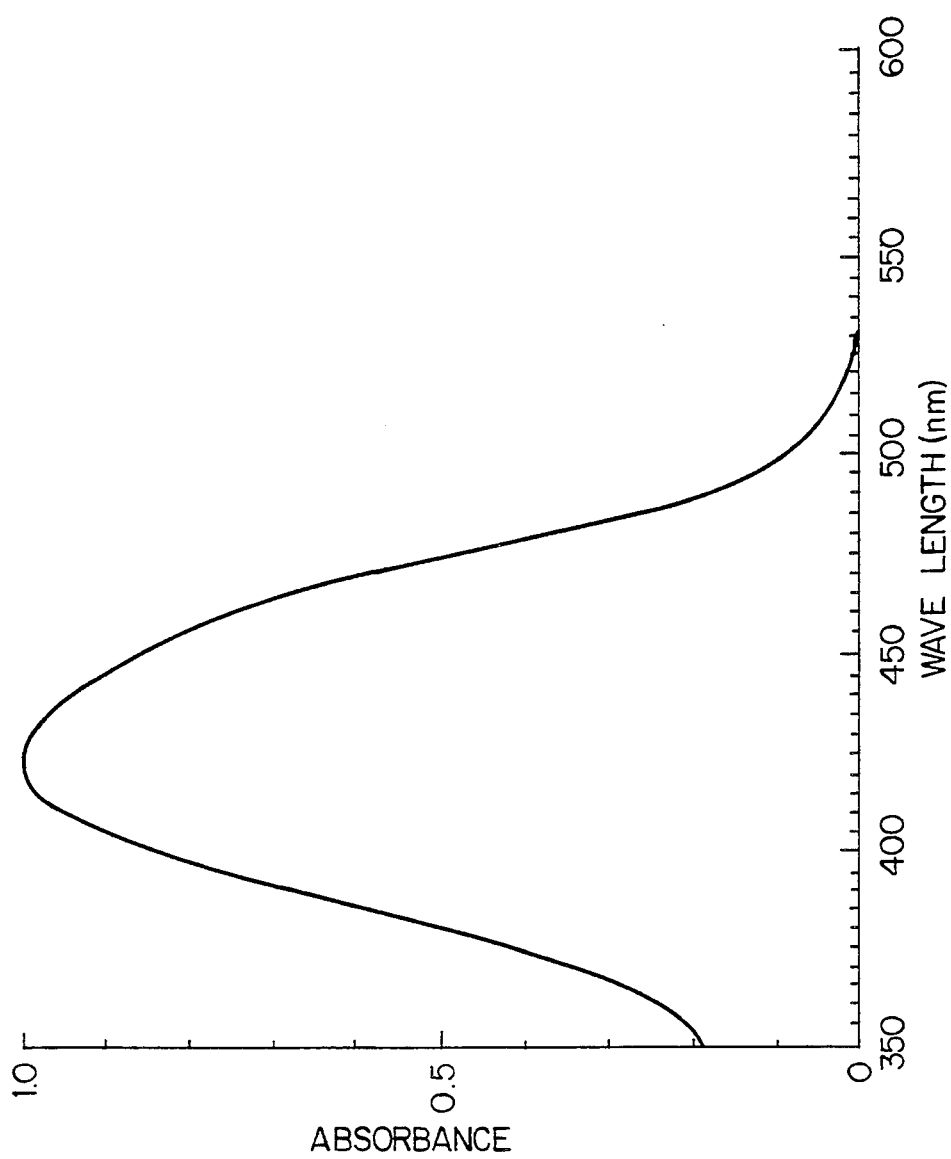
FIG. 3 shows an absorption spectrum of dye 3 of the present invention in ethyl acetate.
Figure 4:
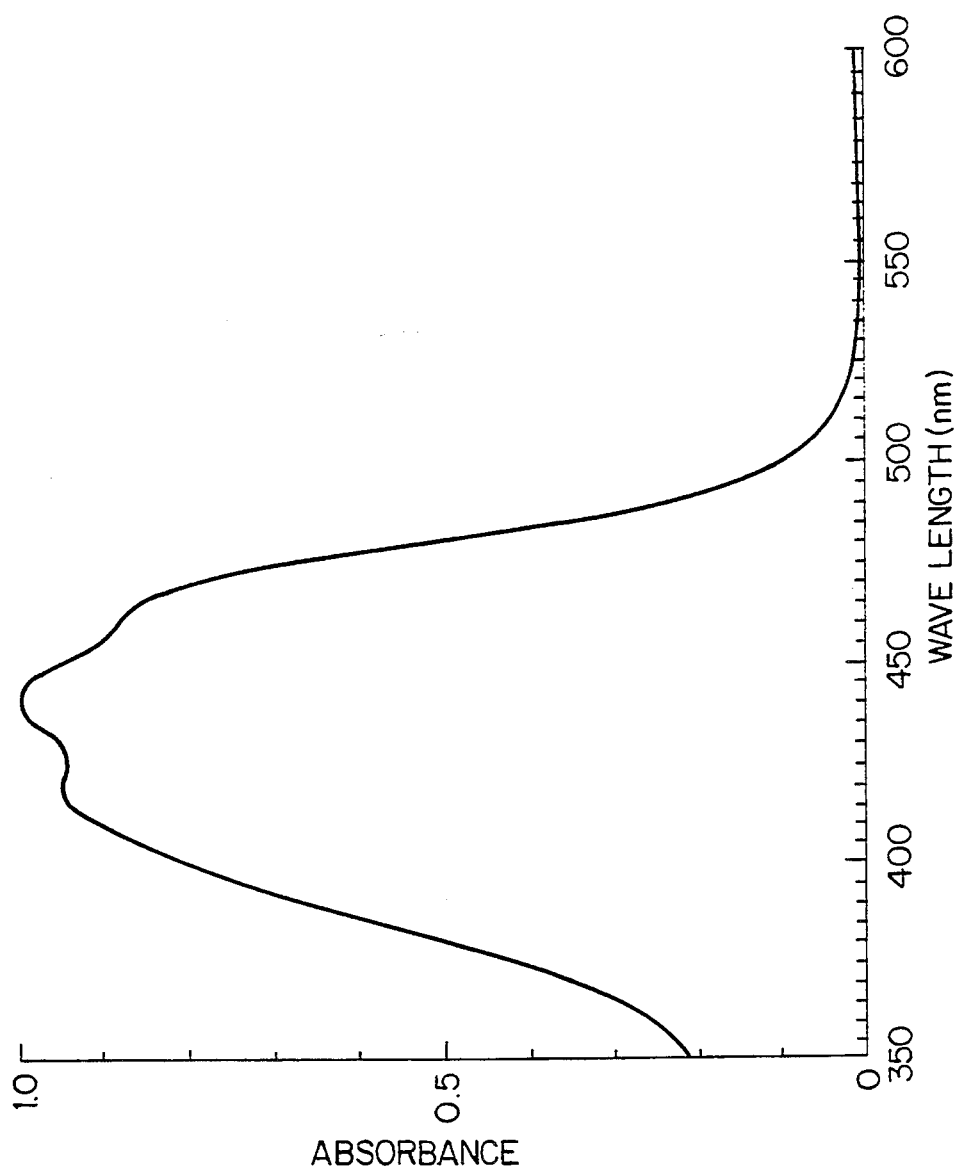
FIG. 4 shows an absorption spectrum of dye 5 of the present invention in ethyl acetate.

It is shown in FIGS. 1 and 2 that, under a basic condition, the dyes represented by formula (I) of the present invention have an absorption peak in a long wavelength region and, at the same time, have a sharp absorption curve.

FIG. 1 shows an absorption spectrum of 1.0 mg of dye 79 dissolved in 100 ml of ethyl acetate (solid line) and an absorption spectrum of 1.0 mg of dye 79 dissolved in 100 ml of dimethylformamide to which 0.05 ml of triethylamine is added (broken line) (Absorption of the vertical is shown to be standardized to 1.0).

FIG. 2 shows an absorption spectrum of 1.0 mg of dye 80 dissolved in 100 ml of ethyl acetate (solid line) and an absorption spectrum of 1.0 mg of dye 80 dissolved in 100 ml of dimethylformamide to which 0.05 ml of trimethylamine is added (broken line) (Absorption of the vertical is shown to be standardized to 1.0).

Although the dyes represented by formula (I) of the present invention show a color tone from yellow to magenta under an undissociated condition, they have an absorption peak in a long wavelength region and have a sharp absorption curve under a basic condition.

The dyes represented by formula (I) of the present invention show a color tone from blue to cyan under a dissociated condition.

EXAMPLE 1

Formation of Thermal Transfer Dye-donating Material Sample (1-1)

A 6 μm-thick polyethylene terephthalate film (product by Teijin Ltd.), the back surface of which had been surface-treated to be heat-resistant and lubricative, was used as a support. The following composition for forming a thermal transfer dye-donating layer was coated on the opposite surface of the film by wire bar-coating in a dry thickness of 1.5 μm. Accordingly, a thermal transfer dye-donating material sample (1-1) was prepared.

Composition for Forming Thermal Transfer Dye Donating Layer

| | |
|---|---|
| Dye 1 | 10 mmol |
| Polyvinyl Butyral Resin (Denka Butyral 5000-A, product by Denki Kagaku Kogyo KK) | 3 g |
| Toluene | 40 cc |
| Methyl Ethyl Ketone | 40 cc |
| Polyisocyanate (Takenate D110N, product by Takeda Chemicals Industries, Ltd.) | 0.2 cc |

Other thermal transfer dye-donating material samples (1-2) to (1-17) of the present invention and a comparative sample (1-18) were prepared in the same manner as above, except that the dye 1 was replaced by a dye indicated in Table 1 below.

Formation of Thermal Transfer Image-receiving Material Sample

A 150 μm-thick synthetic paper (YUPO-FPG-150, product by Oji Yuka Goseishi Co., Ltd.) was used as a support. The following composition for forming a thermal transfer image-receiving layer was coated on one surface of the support by wire bar-coating in a dry thickness of 8 μm. Accordingly, a thermal transfer image-receiving material sample was prepared. Drying of the coated layer was effected first with a drier for pre-drying and then in an oven having a temperature of 100° C. for 30 minutes.

Composition for Forming Thermal Transfer Image-receiving Layer

| | |
|---|---|
| Polyester Resin (Vylon-280, product by Toyobo Co., Ltd.) | 22 g |
| Polyisocyanate (KP-90, product by Dainippon Ink and Chemicals, Inc.) | 4 g |
| Amino-Modified Silicone Oil (KF-857, product by Shin-Etsu Silicone Co.) | 0.5 g |
| Methyl Ethyl Ketone | 85 cc |
| Toluene | 85 cc |
| Cyclohexanone | 15 cc |

Each one of the thermal transfer dye-donating material samples (1-1) to (1-18) prepared as above and the thermal transfer image-receiving material sample prepared as above were attached to each other, with the dye-donating layer facing to the image-receiving layer, and a thermal head was applied to the side of the support of the dye-donating material for effecting printing. As the printing condition, the output power of the thermal head was 0.25 W/dot, the pulse width was from 0.15 to 15 msec, and the dot density was 6 dots/mm. Accordingly, a cyan or magenta color image was printed on the image-receiving layer of the image-receiving material. The cyan or magenta color image thus formed was sharp with no transfer unevenness.

The thus printed materials were stored under dry conditions at 60° C. for 7 days, whereupon the stability of the printed color images was tested. The status-A reflection density of the tested sample having a status-A reflection density of 1.0 was measured after the reflection. The retention percentage of the density after the reflection to the reflection density of 1.0 before the reflection was obtained, which demonstrates the stability (heat-fastness) of each sample. The results obtained are shown in Table 1 below.

TABLE 1

| No. | Dye | Maximum Density | Heat Fastness (%) | Remarks |
|---|---|---|---|---|
| 1-1 | 1 | 1.90 | 81 | Invention |
| 1-2 | 2 | 1.89 | 93 | Invention |
| 1-3 | 3 | 1.92 | 86 | Invention |
| 1-4 | 4 | 1.95 | 90 | Invention |
| 1-5 | 5 | 1.91 | 94 | Invention |
| 1-6 | 8 | 1.91 | 96 | Invention |

TABLE 1-continued

| No. | Dye | Maximum Density | Heat Fastness (%) | Remarks |
| --- | --- | --- | --- | --- |
| 1-7 | 9 | 1.92 | 91 | Invention |
| 1-8 | 14 | 1.99 | 97 | Invention |
| 1-9 | 22 | 1.89 | 97 | Invention |
| 1-10 | 34 | 2.02 | 96 | Invention |
| 1-11 | 37 | 1.91 | 90 | Invention |
| 1-12 | 38 | 1.89 | 89 | Invention |
| 1-13 | 48 | 1.80 | 91 | Invention |
| 1-14 | 62 | 1.95 | 92 | Invention |
| 1-15 | 66 | 1.80 | 88 | Invention |
| 1-16 | 69 | 1.82 | 90 | Invention |
| 1-17 | 74 | 1.80 | 94 | Invention |
| 1-18 | α | 1.80 | 84 | Comparison |

Comparative Dye (α):

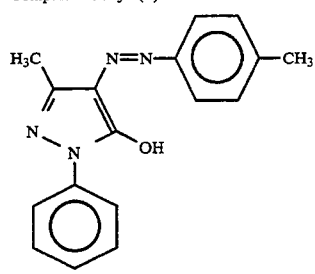

From Table 1, it is understood that the dyes of the present invention give a high transfer density and have high heat fastness.

EXAMPLE 2

Thermal transfer dye-donating material samples (2-1) to (2-5) were formed in the same manner as in Example 1, except that dye 1 in the thermal transfer dye-donating layer coating composition was replaced by a dye indicated in Table 2 below.

Using the respective samples thus formed along with the same image-receiving sample as that formed in Example 1, printing was effected whereupon sharp images with no transfer unevenness were obtained in all cases. The recorded images all had a high density and excellent heat fastness.

TABLE 2

| Thermal Transfer Dye-donating Material Sample | Dye |
| --- | --- |
| 2-1 | 25 |
| 2-2 | 26 |
| 2-3 | 27 |
| 2-4 | 28 |
| 2-5 | 32 |

EXAMPLE 3

Thermal transfer dye-donating material samples (3-1) to (3-6) were formed in the same manner as in Example 1, except that dye 1 in the thermal transfer dye-donating layer containing composition was replaced by a dye indicated in Table 3 below.

Using the respective samples thus formed along with the image-receiving sample mentioned below, printing was effected whereupon sharp images with no transfer unevenness were obtained in all cases. The recorded images all had a high density and excellent heat fastness.

Formation of Thermal Transfer Image-receiving Material Sample

A 150 μm-thick synthetic paper (YUPO-PFG-150, product by Oji Yuka Goseishi Co., Ltd.) was used as a support. The following composition for forming thermal transfer image-receiving layer was coated on one surface of the support by wire bar-coating in a dry thickness of 8 μm. Accordingly, a thermal transfer image-receiving material sample was prepared. Drying of coated layer was effected first with a drier for pre-drying and then in an oven having a temperature of 100° C. for 30 minutes.

Composition for Forming Thermal Transfer Image-receiving Layer

| Polyvinylacetal Resin having an amino group (AEA, product by Sankyo Co., Ltd.) | 22 g |
| --- | --- |
| Polyisocyanate (KP-90, product by Dainippon Ink and Chemicals, Inc.) | 4 g |
| Amino-modified Silicone Oil (K-857, product by Shin-Etsu Silicone Co., Ltd.) | 0.5 g |
| Methyl Ethyl Ketone | 85 cc |
| Toluene | 85 cc |
| Cyclohexane | 15 cc |

For examining the storage stability (wet heat stability) of the thus transferred materials, the materials were stored under a forced condition of 60° C. and 70% in an oven for one week.

The tested samples were evaluated on the basis of the following criteria:

○ : Neither coagulation nor crystallization of the dye was noted by microscopic observation.

△ : Some coagulation or crystallization of the dye was noted by microscopic observation.

X: Coagulation or crystallization of the dye was noted on the whole surface of the sample with the naked eye.

TABLE 3

| Dye-receiving Material Sample No. | Dye | Concentration | Storage Stability | Remarks |
| --- | --- | --- | --- | --- |
| 3-1 | 25 | 2.1 | ○ | Invention |
| 3-2 | 26 | 2.2 | ○ | Invention |
| 3-3 | 27 | 2.1 | ○ | Invention |
| 3-4 | 79 | 2.3 | ○ | Invention |
| 3-5 | 80 | 2.5 | ○ | Invention |
| 3-6 | α | 2.0 | X | Invention |

EXAMPLE 4

Thermal transfer dye-donating material samples (4-1), (4-2) and (4-3) were formed in the same manner as in Example 1, except that the polyvinyl butyral resin and the dye in the thermal transfer dye-donating layer coating composition were replaced by a resin and a dye indicated in Table 4 below.

Using the respective samples thus formed along with the same image-receiving sample as that formed in Example 1, printing was effected whereupon sharp images with no transfer unevenness were obtained in all cases. The recorded samples were then subjected to the same forced heat test as in Example 1, whereupon the heat fastness was good in all cases.

TABLE 4

| Thermal Transfer Dye-donating Material Sample | Resin | Dye | Heat Fastness (retention percentage) |
| --- | --- | --- | --- |
| 4-1 | ethyl cellulose | 33 | 91 |
| 4-2 | cellulose | 35 | 93 |

TABLE 4-continued

| Thermal Transfer Dye-donating Material Sample | Resin | Dye | Heat Fastness (retention percentage) |
|---|---|---|---|
| 4-3 | acetate butyrate polysulfone | 36 | 92 |

The following Examples 5 to 10 illustrate combination of other thermal transfer image-receiving material samples and the preceding thermal transfer dye-donating material samples.

EXAMPLE 5

Formation of Thermal Transfer Image-receiving Material Sample

A 150 μm-thick synthetic paper (YUPO-FPG-150, product by Oji Yuka Goseishi Co., Ltd.) was used as a support. The following composition for forming a thermal transfer image-receiving layer was coated on one surface of the support by wire bar-coating in a dry thickness of 10 μm. Accordingly, a thermal transfer image-receiving material sample was prepared. Drying of the coated layer was effected first with a drier for pre-drying and then in an oven having a temperature of 100° C. for 30 minutes.

Composition for Forming Thermal Transfer Image-receiving Layer

| | |
|---|---|
| Polyester Resin (TP220, product by the Nippon Synthetic Chemical Industry Co., Ltd.) | 2.0 g |
| Amino-Modified Silicone Oil (KF-857, product by Shin-Etsu Silicone Co., Ltd.) | 0.5 g |
| Epoxy-modified Silicone Oil (KF-100T, product by Shin-Etsu Silicone Co., Ltd.) | 0.5 g |
| Methyl Ethyl Ketone | 85 cc |
| Toluene | 85 cc |
| Cyclohexane | 30 cc |

The sample thus formed was combined with each of the thermal transfer dye-donating material samples each containing the dye of the present invention prepared in Examples 1 and 2 and subjected to printing, whereupon sharp images were formed in all cases. In addition, the light fastness and the heat fastness of the images formed were all good.

EXAMPLE 6

Formation of Thermal Transfer Image-receiving Material Sample

A resin-coated paper was prepared by laminating polyethylenes layers of 15 μm and 25 μm on both surfaces of a 200 μm-thick paper. The following composition for forming a thermal transfer image-receiving layer was coated on the surface laminated with the 15 μm-polyethylene layer by wire bar-coating in a dry thickness of 10 μm. After drying, a thermal transfer image-receiving material sample was prepared.

Composition for Forming Image-receiving Layer

| | |
|---|---|
| Polyester Resin (TP220, product by the Nippon Synthetic Chemical Industry Co., Ltd.) | 25 g |
| Amino-Modified Silicone Oil (KF-857, product by Shin-Etsu Silicone Co., Ltd.) | 0.8 g |
| Polyisocyanate (KP-90, product by Dainippon Ink and Chemicals, Inc.) | 4 g |
| Methyl Ethyl Ketone | 100 cc |
| Toluene | 100 cc |

Using the sample thus formed, printing was effected in the same manner as in Example 1, whereupon sharp and high-density images were formed in all cases. In addition, the light fastness and the heat fastness of the images formed were all good.

EXAMPLE 7

Formation of Thermal Transfer Image-receiving Material Sample

A resin-coated paper was prepared by laminating polyethylenes of 15 μm and 25 μm on both surfaces of a 200 μm-thick paper. The following composition for forming transfer image-receiving layer was coated on the surface laminated with the 15 μm-polyethylene layer by wire bar-coating in a dry thickness of 10 μm. After drying, a thermal transfer image-receiving material sample was prepared.

Composition for forming Image-receiving Layer

| | |
|---|---|
| Polyvinylacetal Resin having an amino group (AEA, product by Sankyo Co., Ltd.) | 25 g |
| Amino-Modified Silicone Oil (KF-857, product by Shin-Etsu Silicone Co., Ltd.) | 0.8 g |
| Polyisocyanate (KP-90, product by Dainippon Ink and Chemicals, Inc.) | 4 g |
| Methyl Ethyl Ketone | 100 cc |
| Toluene | 100 cc |

Using the sample thus formed, printing was effected in the same manner as in Example 1, whereupon sharp and high-density images were formed in all cases. In addition, the light fastness and the heat fastness of the images formed were all good.

EXAMPLE 8

Formation of Thermal Transfer image-receiving Material Sample

A dye-receiving polymer solution in an organic solvent, having the composition (B') described below, was emulsified and dispersed in an aqueous gelatin solution having the composition (A') described below, by the use of a homogenizer to prepare a gelatin dispersion of a dye-receiving substance.

| | | |
|---|---|---|
| (A') | Aqueous Gelatin Solution: | |
| | Gelatin | 2.3 g |
| | Sodium Dodecylbenzenesulfonate (5% aqueous solution) | 20 cc |
| | Water | 80 cc |
| (B') | Dye-receiving Polymer Solution: | |
| | Polyester Resin (Vylon-300, product by Toyobo Co., Ltd.) | 7.0 g |
| | Carboxy-modified Silicone Oil (X-22-3710, product by Shin-Etsu Silicone Co., Ltd.) | 0.7 g |
| | Methyl Ethyl Ketone | 20 cc |
| | Toluene | 10 cc |

| | |
|---|---|
| -continued | |
| Triphenyl Phosphate | 1.5 g |

A solution prepared by dissolving 0.5 g of a fluorine surfactant (a) $C_3F_7SO_2N(C_3H_7)CH_2COOK$ in 10 cc of a mixed solvent of water/methanol (1/1) was added to the resulting dispersion, to prepare a composition for coating an image-receiving layer.

The thus prepared composition was coated on a 150 μm-thick synthetic paper (YUPO-SGG-150, product by Oji Yuka Goseishi Co., Ltd.), one surface of which had been surface-treated by corona-discharging, by wire bar-coating in a wet thickness of 75 μm. The coated layer was then dried. Thus, a thermal transfer image-receiving material was obtained.

Using each of the thermal transfer dye-donating material samples, each containing the dye of the present invention, as prepared in Examples 1 and 2 along with the thermal transfer image receiving material sample prepared above, printing was effected in the same way as in Example 1.

The obtained images had a high color density and were sharp, and the fastness thereof was excellent.

EXAMPLE 9

Formation of Thermal Transfer Image-receiving Material Sample

Using the image-receiving layer coating composition described below, a thermal transfer image-receiving material sample was prepared in the same manner as in Example 1.

Composition for Forming Image-receiving Layer

This is the same as the image-receiving layer coating composition used in Example 1, except that 7 g of the following ultraviolet absorbent was added.

Ultraviolet Absorbent

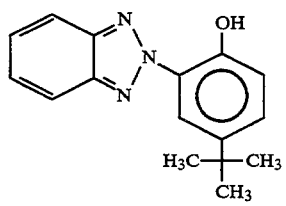

The thus prepared thermal transfer image-receiving material sample was combined with one of the thermal transfer dye-donating materials of the present invention prepared in Examples 1 and 2, and printing was effected in the same manner as in Example 1. As a result, all the printed images had a high density and were sharp. In addition, the fastness of the images were higher than that of the images obtained in Example 1.

EXAMPLE 10

Thermal transfer dye-donating material samples (10-2), (10-3), and (10-5) to (10-7) were prepared in the same manner as in Example 1, except that two dyes (each 5 mmol) as indicated in Table 5 below were used in place of dye 1 (10 mmol) in the coating composition. In addition, thermal transfer dye-donating material samples (10-1), (10-4), and (10-8) to (10-10) were prepared also in the same manner as in Example 1, except that one dye (10 mmol) as indicated in Table 5 below were used in place of dye 1 (10 mmol) in the coating composition. Using each of the thus prepared samples, transfer of the dye(s) to the same thermal transfer dye-receiving material as that prepared in Example 1 was effected in the same manner as in Example 1.

For examining the storage stability (wet heat stability) of the thus transferred materials, the materials were stored under a forced condition of 60° C. and 70% RH in an oven for one week.

The tested samples were evaluated on the basis of the following criteria:

◯ : Neither coagulation nor crystallization of the dye was noted by microscopic observation.

△ : Some coagulation or crystallization of the dye was noted by microscopic observation.

X: Coagulation or crystallization of the dye was noted on the whole surface of the sample with the naked eye.

The results obtained are shown in Table 5 below.

TABLE 5

| Dye-receiving Material Sample No. | Dye | Storage Stability | Color Hue | Remarks |
|---|---|---|---|---|
| 10-1 | 3 | ◯ | Clear orange | Invention |
| 10-2 | 3 and i | ◯ | Clear orange | Invention |
| 10-3 | 3 and h | ◯ | Clear orange | Invention |
| 10-4 | 5 | ◯ | Clear orange | Invention |
| 10-5 | 5 and i | ◯ | Clear orange | Invention |
| 10-6 | 5 and h | ◯ | Clear orange | Invention |
| 10-7 | 5 and p | ◯ | Clear orange | Invention |
| 10-8 | j | X | Somewhat orangish yellow | Comparison |
| 10-9 | h | X | Somewhat orangish yellow | Comparison |
| 10-10 | k | X | Somewhat orangish yellow | Comparison |

As is noted from Table 5 above, aminopyrazole azo dyes have poor storage stability on the image-receiving paper when used alone. However, when they are combined with imidazole azo dyes of the present invention, the storage stability is improved noticeably.

Aminopyrazole azo dyes have a more sharp absorption than the imidazole azo dyes of the present invention and are therefore more disadvantageous for color reproduction than the latter. However, combination of the dyes of the two kinds solve this drawback.

On the other hand, aminopyrazole azo dyes have higher light fastness than the imidazole azo dyes of the present invention. Combination of the dyes of the two kinds improved the light fastness much more than use of only the imidazole azo dyes.

As has been explained in detail in the above, the imidazole azo dyes of the present invention have a sharp absorption wave and have little unnecessary absorption in the long wavelength range. They have higher fastness than any other conventional dyes. Production of them is easy and the cost of them is low.

Where image formation is effected with a thermal transfer dye-donating material containing the imidazole azo dye(s) of the present invention, high-density images free from fading and discoloration may be obtained.

Further, where the imidazole azo dyes of the present invention are used under a basic condition, cyan dyes having a sharp absorption are obtained. The imidazole azo dyes are excellent as dyes which are transferred to image-receiving paper containing a basic material or a mordant. The storage stability of thus formed images is excellent.

In addition, where the imidazole azo dye(s) of the present invention is/are incorporated into a thermal transfer dye-donating material along with aminopyrazole azo dye(s), formation of images having excellent color hue, excellent light fastness and excellent storage stability is possible.

While the invention has been described in detail and with reference to specific embodiments thereof, it will be apparent to one skilled in the art that various changes and modifications can be made therein without departing from the spirit and scope thereof.

What is claimed is:

1. An imidazole azo dye of formula (I):

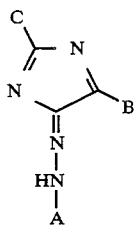
(I)

wherein A represents aryl, imidazolyl, pyridyl, pyrazolyl, thiazolyl, benzimidazolyl, quinolyl, benzopyrazolyl, benzothiazolyl, isothiazolyl, benzisothiazolyl, pyridoisothiazolyl, or thiadiazolyl;

B represents oxycarbonyl, aminocarbonyl, carbonylamino, oxycarbonylamino, aminocarbonylamino, sulfonyl, acyl, aryl, carbamoyl, alkoxycarbonylamino, aryloxycarbonylamino, sulfonylamino, cyano, imidazolyl, pyridyl, pyrazolyl, thiazolyl, benzimidazolyl, quinolyl, benzopyrazolyl, benzothiazolyl, isothiazolyl, benzisothiazolyl, pyridoisothiazolyl, or thiadiazolyl; and C represents aryl, cyano, carboxyl, acyl, carbamoyl, alkoxycarbonyl, aryloxycarbonyl, carbonylamino, alkoxycarbonylamino, aryloxycarbonylamino, sulfonylamino, aminocarbonylamino, sulfamoylamino, amino, alkoxy, aryloxy, silyoxy, heteryloxy, arylthio, herylthio, pyridyl, furyl, thiophenyl, oxazolyl, isothiazolyl, thiazolyl, pyrrolyl, imidazolyl, isoxazolyl, pyrazolyl, furazyl, pyrimidyl, or indolyl.

2. An imidazole azo dye as claimed in claim 1, wherein the heteryloxy represented by C is one member selected from the group consisting of tetrahydropyranyloxy, 3-pyridyloxy, and 2-(1,3-benzimidazolyl)oxy.

3. An imidazole azo dye as claimed in claim 1, wherein the herylthio represented by C is one member selected from the group consisting of 2-pyridylthio, 2-(1,3-benzoxazolyl)thio, 1-hexadecyl-1,2,3,4-tetrazolyl-5-thio, and 1-(3-N-octadecylcarbamoylphenyl-1,2,3,4-tetrazolyl-5-thio.

4. An imidazole azo dye as claimed in claim 1, wherein A is one member selected from the group consisting of imidazolyl, pyridyl, pyrazolyl, thiazolyl, benzimidazolyl, quinolyl, benzopyrazolyl, benzothiazolyl, isothiazolyl, benzisothiazolyl, pyridoisothiazolyl, and thiadiazolyl; and C is aryl.

5. An imidazole azo dye as claimed in claim 1, wherein the imidazole azo dye is dissociated under basic conditions.

6. An imidazole azo dye as claimed in claim 5, wherein the imidazole azo dye is a cyan dye.

7. An imidazole azo dye as claimed in claim 1, wherein the imidazole azo dye is a yellow imidazole azo dye having an absorption peak wavelength of 470 nm or less.

* * * * *